United States Patent
Kwak et al.

(10) Patent No.: US 11,637,642 B2
(45) Date of Patent: *Apr. 25, 2023

(54) METHOD AND APPARATUS FOR CSI REPORTING IN WIRELESS COMMUNICATION SYSTEM

(71) Applicant: Samsung Electronics Co., Ltd., Gyeonggi-do (KR)

(72) Inventors: Youngwoo Kwak, Gyeonggi-do (KR); Hoondong Noh, Gyeonggi-do (KR); Cheolkyu Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 39 days.

This patent is subject to a terminal disclaimer.

(21) Appl. No.: 17/306,439

(22) Filed: May 3, 2021

(65) Prior Publication Data

US 2021/0258090 A1 Aug. 19, 2021

Related U.S. Application Data

(63) Continuation of application No. 16/245,579, filed on Jan. 11, 2019, now Pat. No. 10,998,989.

(30) Foreign Application Priority Data

Jan. 11, 2018 (KR) .................. 10-2018-0004099
Jan. 12, 2018 (KR) .................. 10-2018-0004638

(51) Int. Cl.
*H04W 24/10* (2009.01)
*H04B 17/327* (2015.01)
(Continued)

(52) U.S. Cl.
CPC ........... *H04B 17/327* (2015.01); *H04B 17/24* (2015.01); *H04L 1/0693* (2013.01); *H04W 24/10* (2013.01); *H04W 72/14* (2013.01); *H04W 76/11* (2018.02)

(58) Field of Classification Search
CPC ..... H04B 17/24; H04B 17/327; H04W 24/10; H04W 72/14; H04W 76/11; H04L 1/0693
See application file for complete search history.

(56) References Cited

U.S. PATENT DOCUMENTS 10,998,989 B2 * 5/2021 Kwak .................. H04W 24/10
2012/0039252 A1 2/2012 Damnjanovic et al.
(Continued)

FOREIGN PATENT DOCUMENTS

| JP | 2013-110657 | 6/2013 |
| KR | 1020130048253 | 5/2013 |
| KR | 10-2018-0084594 | 7/2019 |

OTHER PUBLICATIONS

Sharp, APT, "Remaining issues on CSI Reporting", R1-1720612, 3GPP TSG RAN WG1 WG1#91 Meeting, Nov. 27-Dec. 1, 2017, 3 pages.
(Continued)

*Primary Examiner* — Anez C Ebrahim
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a priority of CSI reporting in a mobile communication system, and provides a method in which a UE performs CSI reporting with high priority according to the priority. The method includes receiving channel state information (CSI) feedback configu-
(Continued)

ration information from a base station; identifying a CSI reporting to be performed based on the CSI feedback configuration information, as a result of two CSI reportings overlapping; and performing the identified CSI reporting to the base station. The CSI reporting is identified based on types of CSI reportings, and a CSI reporting associated with a reference signal received power (RSRP) is prioritized over a CSI reporting that is not associated with the RSRP.

20 Claims, 30 Drawing Sheets

(51) Int. Cl.
*H04L 1/06* (2006.01)
*H04W 72/14* (2009.01)
*H04W 76/11* (2018.01)
*H04B 17/24* (2015.01)

(56) References Cited

U.S. PATENT DOCUMENTS

| | | |
|---|---|---|
| 2013/0114455 A1 | 5/2013 | Yoo et al. |
| 2014/0153526 A1 | 6/2014 | Mazzarese |
| 2014/0328304 A1 | 11/2014 | Suzuki et al. |
| 2015/0063287 A1 | 3/2015 | Mazzarese |
| 2016/0157184 A1 | 6/2016 | Wang |
| 2017/0237478 A1 | 8/2017 | Kwak et al. |

OTHER PUBLICATIONS

Huawei, HiSilicon, "Remaining Issues for CSI Reporting", R1-1719425, 3GPP TSG RAN WG1 Meeting #91, Nov. 27-Dec. 1, 2017, 9 pages.
Qualcomm Incorporated, "Remaining Details on CSI Reporting", R1-1720661, 3GPP TSG RAN WG1 Meeting #91, Nov. 27-Dec. 1, 2017, 4 pages.
International Search Report dated Apr. 12, 2019 issued in counterpart application No. PCT/KR2019/000380, 3 pages.
Korean Office Action dated May 30, 2022 issued in counterpart application No. 10-2018-0004638, 7 pages.

* cited by examiner

FIG. 30
2D antenna port layout (N₂ >1) : 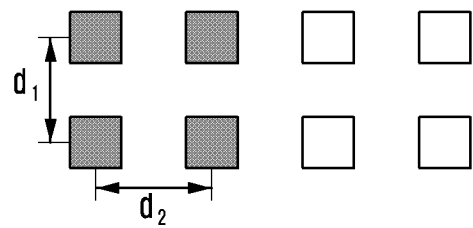
1D antenna port layout (N₂ =1) : 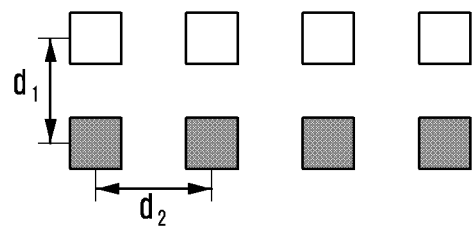

METHOD AND APPARATUS FOR CSI REPORTING IN WIRELESS COMMUNICATION SYSTEM

CROSS-REFERENCE TO RELATED APPLICATION(S)

This application is a Continuation Application of U.S. patent application Ser. No. 16/245,579, which was filed on Jan. 11, 2019 in the U.S. Patent and Trademark Office, and claims priority under 35 U.S.C. § 119(a) to Korean Patent Application Nos. 10-2018-0004099 and 10-2018-0004638, which were filed on Jan. 11, 2018 and Jan. 12, 2018, respectively, in the Korean Intellectual Property Office, the disclosure of each of which is incorporated by reference herein in its entirety.

BACKGROUND

1. Field

The present disclosure relates generally to a method and apparatus for channel state information (CSI) reporting in a wireless communication system.

2. Description of Related Art

To meet the increasing demand for wireless data traffic since deployment of 4 generation (4G) communication systems, efforts have been made to develop an improved $5^{th}$ generation (5G) or pre-5G communication system. The 5G or pre-5G communication system may also be referred to as a "beyond 4G network" or a "post long term evolution (LTE) system". The 5G communication system is intended to be implemented in higher frequency (mmWave) bands, e.g., 60 GHz bands, in order to provide higher data rates.

To decrease propagation loss of radio waves and increase transmission distances, beamforming, massive multiple-input multiple-output (MIMO), full dimensional MIMO (FD-MIMO), array antennas, analog beam forming, and large scale antenna techniques are being developed for use in 5G communication systems. In addition, in 5G communication systems, development for system network improvement based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc., is underway.

In the 5G system, hybrid frequency-shift keying (FSK) and quadrature amplitude modulation (QAM) (FQAM) and sliding window superposition coding (SWSC) have been developed for an advanced coding modulation (ACM), and filter bank multi carrier (FBMC), non-orthogonal multiple access (NOMA), and sparse code multiple access (SCMA) have been developed as advanced access technologies.

The Internet, which is a human centered connectivity network where humans generate and consume information, is now evolving to the Internet of things (IoT) wherein distributed entities, i.e., things, exchange and process information without human intervention. The Internet of everything (IoE) has emerged, which is a combination of the IoT technology and the big data processing technology through connection with a cloud server.

As technology elements, such as "sensing technology", "wired/wireless communication and network infrastructure", "service interface technology", and "security technology" will likely be required for IoT implementation, a sensor network, a machine-to-machine (M2M) communication, machine type communication (MTC), etc., have been researched. Such an IoT environment may provide intelligent Internet technology services that create a new value to human life by collecting and analyzing data generated among connected things. IoT may be applied to a variety of fields including smart homes, smart buildings, smart cities, smart cars or connected cars, smart grids, health care, smart appliances, and advanced medical services through convergence and combination of existing information technology (IT) and various industrial applications.

Consequently, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered as an example of the convergence between the 5G technology and the IoT technology.

In new radio (NR), which is a new type of 5G communication, communication is performed on the basis of beams, unlike the existing LTE, because NR supports a band of 6 GHz band or higher, which is higher than the existing LTE band, and there are not many existing systems in this band, such that more bands can be secured. However, in order to support bands of 6 GHz or higher, many things, such as pathloss, should be considered, unlike the existing LTE band. As a band used for wireless communication becomes higher, a path attenuation that occurs in the band increases. As a result, a coverage area supported by a corresponding base station decreases based on the same transmission power.

Accordingly, in order to overcome the path attenuation, support of a beam for concentrating and transmitting transmission power in a direction in which a base station desires to transmit the transmission power is needed and the number of directions supportable by one beam is reduced according to the support of the beam. Therefore, there is need for a method to efficiently select and manage such beams. CSI reporting should also be performed in consideration of beam-related information.

Further, a terminal in the NR reports CSI and beam management-related information, and therefore, a priority of a CSI reporting should also be defined.

SUMMARY

The present disclosure has been made to address the above-mentioned problems and disadvantages, and to provide at least the advantages described below.

Accordingly, an aspect of the present disclosure is to provide a terminal and method thereof, which efficiently report CSI and beam management-related information to a base station according to a priority of CSI reporting. Through the CSI and beam management-related information reporting, the CSI can be efficiently identified despite a limited amount of information being used for the CSI reporting.

In accordance with an aspect of the present disclosure, a method of a terminal in a wireless communication system is provided. The method includes receiving CSI feedback configuration information from a base station; identifying a CSI reporting to be performed based on the CSI feedback configuration information, as a result of two CSI reportings overlapping; and performing the identified CSI reporting to the base station. The CSI reporting is identified based on types of CSI reportings, and a CSI reporting associated with a reference signal received power (RSRP) is prioritized over a CSI reporting that is not associated with the RSRP.

In accordance with another aspect of the present disclosure, a method of a base station in a wireless communication system is provided. The method includes transmitting CSI feedback configuration information to a terminal; identifying a CSI reporting to be performed based on the CSI feedback configuration information, as a result of two CSI reportings overlapping; and receiving the identified CSI reporting from the terminal. The CSI reporting is identified based on types of CSI reportings, and a CSI reporting associated with an RSRP is prioritized over a CSI reporting that is not associated with the RSRP.

In accordance with another aspect of the present disclosure, a base station in a wireless communication system is provided. The base station includes a transceiver; and a controller coupled with the transceiver and configured to receive CSI feedback configuration information from a base station, identify a CSI reporting to be performed based on the CSI feedback configuration information, as a result of two CSI reporting overlapping, and perform the identified CSI reporting to the base station. The CSI reporting is identified based on types of CSI reportings, and a CSI reporting associated with an RSRP is prioritized over a CSI reporting that is not associated with the RSRP.

In accordance with another aspect of the present disclosure, a terminal for receiving data in a wireless communication system is provided. The terminal includes a transceiver; and a controller coupled with the transceiver and configured to transmit CSI feedback configuration information to a terminal, identify a CSI reporting to be performed based on the CSI feedback configuration information, as a result of two CSI reportings overlapping, and receive the identified CSI reporting from the terminal, The CSI reporting is identified based on types of CSI reportings, and a CSI reporting associated with an RSRP is prioritized over a CSI reporting that is not associated with the RSRP.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 30 illustrates antenna port layouts according to an embodiment.

DETAILED DESCRIPTION

Figure 1:
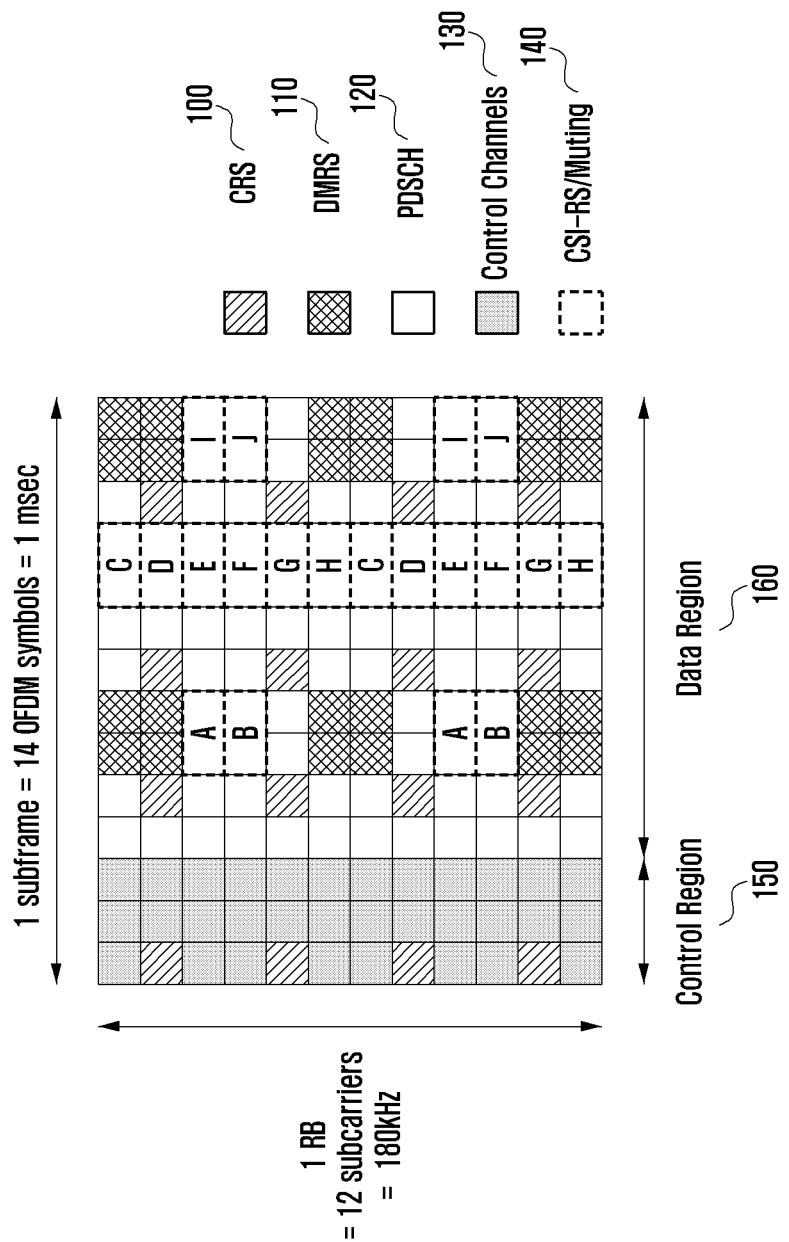
FIG. 1 illustrates a radio resource configuration of an LTE system.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

In recent years, various mobile communication standards such as LTE of the 3rd Generation Partnership Project (3GPP), ultra mobile broadband (UMB) of 3GPP2, Institute of Electrical and Electronics Engineers (IEEE) 802.16m, etc., have been developed to support high-speed and high-quality wireless packet data transmission services based on multiple access schemes using multi-carriers.

More specifically, these existing third generation evolved mobile communication systems, such as LTE, UMB, 802.16m, etc., are based on a multi-carrier multiple access scheme. In order to improve the transmission efficiency, a MIMO multiple antenna is applied, and various techniques such as beaming-forming, an adaptive modulation and coding (AMC) scheme, a channel sensitive scheduling scheme, etc., may be used. The above-mentioned techniques may concentrate transmission power transmitted from various antennas according to channel quality or may adjust an amount of transmitted data, and selectively transmit data to a user with excellent channel quality to improve the transmission efficiency, thereby improving the system capacity performance.

Most of these techniques operate based on channel state information between a base station (BS) (e.g., an evolved Node B (eNB) and a terminal (e.g., a UE or a mobile station (MS)), and therefore, the eNB or the UE should measure the channel state therebetween, e.g., using a CSI-RS. The eNB may perform downlink (DL) transmission, which refers to a transmission path to a UE from the eNB, and uplink (UL) reception, which refers to a transmission path from a UE to the eNB. One eNB may perform transmission/reception on a plurality of cells. In a mobile communication system, a plurality of eNBs are geographically dispersed.

Existing 3G and 4G mobile communication systems, such as LTE or LTE-Advanced (LTE-A), utilize MIMO techniques for transmitting data using a plurality of transmission/reception antennas in order to increase data transmission rate and system capacity. Using a MIMO technique, a plurality of information streams may be spatially separated and transmitted by utilizing the plurality of transmission/reception antennas, i.e., spatially multiplexed.

In general, the number of information streams to which spatial multiplexing can be applied changes depending on the number of antennas of each transmitter and receiver. The number of information streams to which spatial multiplexing can be applied may be referred to as a rank of the corresponding transmission. A MIMO technique supported by standards up to LTE-A Release 11 supports spatial multiplexing for 16 transmission antennas and 8 reception antennas, and supports up to 8 ranks.

An NR access technology, which is part of the 5G mobile communication system being discussed, are intended to support various services such as enhanced mobile broadband (eMBB), massive machine type communications (mMTC), ultra-reliable low latency communications (URLLC), etc. To this end, a reference signal that is always transmitted is a conventional system may be minimized, such that the transmission of the reference signal may be aperiodically performed, in order to more flexibly use time and frequency resources.

To avoid obscuring the subject matter of the present disclosure, descriptions of techniques, which are well known in the art to which the present disclosure belongs and which are not directly related to the present disclosure will not be described.

Additionally, some elements are exaggerated, omitted, or schematically shown in the accompanying drawings. Accordingly, the size of each element does not necessarily reflect the actual size of each element.

In the drawings, the same or corresponding elements are denoted by the same reference numerals.

Each block of the flowcharts, and combinations of blocks in the flowcharts, may be implemented by computer program instructions. The computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). The computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowcharts may represent a module, segment, or portion of code, which includes one or more executable instructions for implementing the specified logical function(s). In some alternative implementations, the functions noted in the blocks may occur in a different order than illustrated. For example, two blocks shown in succession may in fact be executed substantially concurrently or the blocks may sometimes be executed in the reverse order, depending upon the functionality involved.

Herein, the term "unit" may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a unit may include, e.g., components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and units may be combined into fewer components and units or further separated into additional components and units. In addition, the components and units may be implemented such that they execute one or more central processing units (CPUs) in a device or a security multimedia card.

The terms used herein are defined in consideration of functions of the present disclosure, and may be changed according to the intention of a user, an operator, etc. Therefore, definitions of terms should be based on the contents throughout the specification.

Although an NR system, an LTE system, and an LTE-A system will be referenced below in describing embodiments of the present disclosure, the present disclosure is not limited to these systems, and can be applied to other communication systems using a licensed band and an unlicensed band.

FIG. 1 illustrates a radio resource configuration of an LTE system. Specifically, FIG. 1 illustrates a radio resource of one subframe or one resource block (RB), which is a minimum unit that can be scheduled in the DL in an LTE system.

Referring to FIG. 1, the radio resource includes one subframe on a time axis and one RB on a frequency axis. The radio resource includes 12 subcarriers in a frequency domain and 14 orthogonal frequency division multiplex (OFDM) symbols in a time domain, and thus, has a total of 168 natural frequencies and time positions. In LTE, the respective natural frequencies and time positions are referred to as resource elements (REs).

The following different types of signals may be transmitted through the radio resource illustrated in FIG. 1.

1. Cell specific RS (CRS) 100: a reference signal periodically transmitted for all UEs belonging to one cell, which can be commonly used by a plurality of UEs.

2. Demodulation Reference Signal (DMRS) 110: a reference signal transmitted for a specific UE and transmitted only when data is transmitted to the UE. The DMRS may include a total of 8 DMRS ports. In LTE-A, ports 7 to 14 correspond to DMRS ports, and the ports maintain orthogonality so that they do not interfere with each other using code division multiplexing (CDM) or frequency division multiplexing (FDM).

3. Physical DL Shared Channel (PDSCH) 120: a data channel transmitted in the DL and used to transmit traffic to a UE by an eNB. Data is transmitted using an RE to which the reference signal is not transmitted in a data region 160 of FIG. 1.

4. CSI-RS 140: a reference signal transmitted for UEs belonging to one cell, which may be used to measure a channel state. A plurality of CSI-RSs can be transmitted to one cell.

5. Other control channels (Physical Hybrid-ARQ Indicator Channel (PHICH), Physical Control Format Indicator Channel (PCFICH), physical DL control channel {PDCCH}) 130: channels used to provide control information for a UE to receive a PDSCH or to transmit an acknowledgement/negative acknowledgement (ACK/NACK) for operating a hybrid automatic repeat request (HARQ) for UL data transmission.

In addition to the above-mentioned signals, in the LTE system, a muting 140 can be set so that a CSI-RS transmitted by another eNB can be received at UEs of a corresponding cell without interference. The muting 140 can be applied at a position where the CSI-RS can be transmitted. Generally, a UE receives a traffic signal by skipping a corresponding radio resource. In the LTE-A system, the muting is also referred to as a zero-power CSI-RS because the muting is applied to a position of the CSI-RS due to the characteristics of the muting and the transmission power is not transmitted.

In FIG. 1, a CSI-RS can be transmitted using some of positions A, B, C, D, E, F, G, H, I and J, according to the number of antennas transmitting the CSI-RS. The muting can also be applied to some of the positions A, B, C, D, E, F, G, H, I, and J. In particular, the CSI-RS can be transmitted using 2, 4, or 8 REs according to the number of antenna ports transmitting the CSI-RS. When the number of antenna ports is 2, the CSI-RS is transmitted from half of a specific pattern in FIG. 1. When the number of antenna ports is 4, the CSI-RS is transmitted from the entire specific pattern. When the number of antenna ports is 8, the CSI-RS is transmitted using 2 patterns. However, when muting, one pattern unit is used. That is, although muting can be applied to a plurality of patterns, the muting cannot be applied to only a portion of a pattern, when the position of the muting does not overlap with the CSI-RS. However, the muting can be applied to a portion of one pattern when the position of the CSI-RS does overlap with the position of the muting.

When a CSI-RS for 2 antenna ports is transmitted, the eNB transmits signals of the respective antenna ports in two REs connected in the time axis, and the signals of each antenna port are classified by orthogonal codes.

When a CSI-RS for 4 antenna ports is transmitted, the signal for the 2 additional antenna ports is transmitted in the same method by using 2 more REs than the CSI-RS for 2 antenna ports. The same occurs when a CSI-RS for 8 antenna ports is transmitted.

For CSI-RSs supporting 12 and 16 antenna ports, 3 transmission positions of the CSI-RS for 4 existing antenna ports are combined, or 2 transmission positions of the CSI-RS for 8 antenna ports are combined.

In addition, a UE can be allocated with a CSI-interference measurement (IM) (or an interference measurement resource (IMR)) together with the CSI-RS. A CSI-IM resource has the same resource structure and position as the CSI-RS supporting 4 ports. The CSI-IM is a resource for a UE that receives data from one or more eNBs to accurately measure interference from an adjacent eNB. For example, if the adjacent eNB wants to measure an amount of interference when transmitting data, and an amount of interference when not transmitting data, the eNB establishes a CSI-RS and two CSI-IM resources. Here, one CSI-IM causes the adjacent eNB to always transmit signals, and the other CSI-IM causes the adjacent eNB to not always transmit signals, so that the amount of interference of the adjacent eNB can be effectively measured.

Table 1 below shows a radio resource control (RRC) field for establishing CSI-RS setting.

TABLE 1

| RRC setting for supporting periodic CSI-RS in CSI process | | | |
|---|---|---|---|
| CSI-RS config | CSI-IM config | CQI report config | Etc. |
| Number of antenna ports resource config: time and frequency position in a subframe subframe config: periodicity and subframe offset Quasi co-location (QCL)-CRS-info (QCL type B): CRS information for CoMP | resource config: time and frequency position in a subframe subframe config: periodicity and subframe offset | periodic: mode, resource, periodicity, offset etc. aperiodic: mode etc. Precoder Matrix Indicator (PMI)/RI report RI reference CQI process subframepattern | Pc codebook subset restriction |

As shown in Table 1, a configuration for CSI reporting based on a periodic CSI-RS in the CSI process may be classified into four types. CSI-RS config is used to set frequency and time position of a CSI-RS RE. The number of ports of a corresponding CSI-RS is set through setting the number of antennas.

Resource config sets an RE position in an RB, and subframe config sets periodicity and offset of a subframe.

Tables 2A and 2B below are for setting resource config and subframe config, respectively, which are currently supported by LTE.

TABLE 2A

Resource config setting

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 — 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only — 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

TABLE 2B

Subframe config setting

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

A UE can identify frequency and time position and periodicity and offset from Tables 2A and 2B above.

Referring again to Table 1, QCL-CRS-info sets quasi co-location information for CoMP. CSI-IM config is used to set frequency and time position of CSI-IM for measuring interference. Because CSI-IM is always set based on 4 ports, it is not necessary to set the number of antenna ports. Resource config and subframe config are set in the same way as that in the CSI-RS.

CQI report config sets a method of CSI reporting using a corresponding CSI process. In this setting, there are periodic CSI reporting setting, aperiodic CSI reporting setting, PMI/RI reporting setting, RI reference CSI process setting, and subframe pattern setting.

The subframe pattern is used to set, in measurement of channels and interference received by a UE, a measurement subframe subset for supporting the measurement of the channels and interference having temporal different characteristics.

The measurement subframe subset was introduced to reflect and estimate different interference characteristics of an almost blank subframe (ABS) and a general subframe, other than the ABS, in an enhanced inter-cell interference coordination (eICIC). The measurement subframe subset has been developed into an improved form in such a manner that 2 IMRs are set and measured in order to measure different channel characteristics between a subframe that always operates as a DL and a subframe that can be dynamically switched from a DL to a UL in an enhanced interference mitigation and traffic adaptation (eIMTA).

Tables 3 and 4 below show the measurement subframe subsets for supporting the eICIC and the eIMTA.

TABLE 3

```
CQI-ReportConfig-r10 ::= SEQUENCE {
  cqi-ReportAperiodic-r10              CQI-ReportAperiodic-r10
    OPTIONAL, -- Need ON
  nomPDSCH-RS-EPRE-Offset              INTEGER (−1..6),
  cqi-ReportPeriodic-r10               CQI-ReportPeriodic-r10
    OPTIONAL, -- Need ON
  pmi-RI-Report-r9                     ENUMERATED {setup}
    OPTIONAL, -- Cond PMIRIPCell
  csi-SubframePatternConfig-r10        CHOICE {
    release                              NULL,
    setup                                SEQUENCE {
      csi-MeasSubframeSet1-r10
  MeasSubframePattern-r10,
      csi-MeasSubframeSet2-r10
  MeasSubframePattern-r10
    }
  }                         OPTIONAL -- Need ON
}
```

TABLE 4

```
CQI-ReportConfig-v1250 ::=          SEQUENCE {
    csi-SubframePatternConfig-r12       CHOICE {
        release                             NULL,
        setup                               SEQUENCE {
            csi-MeasSubframeSets-r12            BIT STRING
(SIZE (10))
        }
    }                                   OPTIONAL, -- Need ON
    cqi-ReportBoth-v1250                CQI-ReportBoth-
v1250 OPTIONAL, -- Need ON
    cqi-ReportAperiodic-v1250 CQI-ReportAperiodic-v1250
OPTIONAL, -- Need ON
    altCQI-Table-r12            ENUMERATED {
                                    allSubframes, csi-
SubframeSet1,
                                    csi-SubframeSet2,
spare1}     OPTIONAL        -- Need OP
}
```

An eICIC measurement subframe subset supported by LTE is set using csi-MeasSubframeSet1-r10 and csi-MeasSubframeSet2-r10. MeasSubframePattern-r10 referred to by a corresponding field is shown in Table 5 below.

TABLE 5

```
--ASN1START
MeasSubframePattern-r10 ::= CHOICE {
    subframePatternFDD-r10          BIT STRING (SIZE (40)),
    subframePatternTDD-r10          CHOICE {
        subframeConfig1-5-r10           BIT STRING
(SIZE (20)),
        subframeConfig0-r10             BIT
STRING (SIZE (70)),
        subframeConfig6-r10             BIT
STRING (SIZE (60)),
        ...
    },
    ...
}
--ASN1STOP
```

The left most significant bit (MSB) in the above field indicates a subframe #0, and "1" indicates that the corresponding subframe is included in the measurement subframe subset. Unlike the eICIC measurement subframe subset, which sets each subframe set through each field, the eIMTA measurement subframe set uses one field. Here, "0" indicates that the corresponding subframe belongs to a first subframe set, and "1" indicates that the corresponding subframe belongs to a second subframe set. Accordingly, in the eICIC, the subframe may not be included in two subframe sets. However, in the eIMTA subframe set, the subframe should always be included in one of the two subframe sets.

In addition, $P_C$ indicates a power ratio between a PDSCH and a CSI-RS RE for a UE to generate a CSI reporting, and a codebook subset restriction for setting which codebook a corresponding subset is to be used for. The $P_C$ and codebook subset restriction are set by a p-C-AndCBSRList field in Table 6, which includes two P-C-AndCBSR fields of Table 7 in the form of a list, and each P-C-AndCBSR field indicates a setting for each subframe subset.

TABLE 6

```
CSI-Process-r11 ::=     SEQUENCE {
    ...
    p-C-AndCBSRList-r11     SEQUENCE (SIZE (1..2)) OF P-C-
AndCBSR-r11,
    ...
}
```

TABLE 7

```
P-C-AndCBSR-r11 ::=     SEQUENCE {
    p-C-r11                         INTEGER (-8.. 15),
    codebookSubsetRestriction-r11 BIT STRING
}
```

$P_C$ may be defined as shown in Equation (1), and designates a value between −8 and 15 dB.

$$P_C = \frac{PDSCH\ EPRE}{CSI\text{-}RS\ EPRE} \qquad (1)$$

In Equation (1), EPRE represents energy per resource element.

An eNB may variably adjust CSI-RS transmission power for various purposes, such as improving the channel estimation accuracy, and a UE may know how much lower or higher the transmission power to be used for data transmission than the transmission power used for channel estimation, through the notified $P_C$. Accordingly, even when the eNB varies the CSI-RS transmission power, the UE can calculate a correct CQI and report the calculated CQI to the eNB.

In a cellular system, an eNB transmits a reference signal to a UE in order to measure a DL channel state. In an LTE-A system, a UE measures a channel state between an eNB and the UE using a CRS or a CSI-RS transmitted by the eNB. The channel state may consider several factors, including an amount of interference in a DL. The amount of interference in the DL includes an interference signal and a thermal noise generated by an antenna belonging to the adjacent eNB, and is important for a UE to determine a channel condition of the DL. For example, when a signal is transmitted from an eNB having one transmission antenna to a UE having one reception antenna, the UE uses the reference signal received from the eNB to identify energy per symbol that can be received in the DL and an amount of interference to be simultaneously received in an interval in which a corresponding symbol is received, thereby determining an energy ratio per symbol (Es) to amount of interference (Io), i.e., Es/Io. The determined Es/Io is converted into a data transmission rate or a value corresponding thereto, and is notified to the eNB in the form of a CQI, so that the eNB can determine whether to transmit data to the UE at a certain data transmission rate in the DL.

In an LTE system, the UE feeds back information on the channel state of the DL to the eNB so that the information can be utilized for DL scheduling of the eNB. That is, the UE measures a reference signal transmitted by the eNB in the DL, and feeds back information extracted from the measured reference signal to the eNB in a form defined by the LTE-A standard. Generally, there are three types of information that the UE feeds back in LTE:

RI: a number of spatial layers that UE can receive in current channel state

PMI: an indicator for a precoding matrix preferred by a UE in a current channel state CQI: a maximum data rate that a UE can receive in a current channel state. The CQI can be replaced by a signal-to-noise and interference ratio (SINR) that can be utilized similar to the maximum data rate, a maximum error correction coding rate and modulation scheme, or data efficiency per frequency.

The RI, PMI, and CQI are related to each other.

For example, a precoding matrix supported by LTE is defined differently for each rank. Therefore, a PMI value, when an RI has a value of 1, and a PMI value, when an RI has a value of 2, are interpreted differently, even if their values are the same. Also, when the UE determines the CQI, it is assumed that a rank value and a PMI value, which are notified by the UE to the eNB, are applied to the eNB. That is, when the UE notifies the eNB of RI_X, PMI_Y, and CQI_Z, when rank is RI_X and precoding is PMI_Y, the UE can receive data of a transmission rate corresponding to CQI_Z. Accordingly, when calculating the CQI, the UE assumes a transmission scheme to be performed in the eNB so that optimized performance can be obtained when actual transmission is performed in the corresponding transmission scheme.

In LTE, the UE's periodic feedback is set to one of the following four feedback modes (reporting modes) depending on what information the feedback contains.

Reporting mode 1-0 (wideband CQI with no PMI): RI, wCQI

Reporting mode 1-1 (wideband CQI with single PMI): RI, wCQI, PMI

Reporting mode 2-0 (subband CQI with no PMI): RI, wCQI, narrowband (subband) CQI (sCQI)

Reporting mode 2-1 (subband CQI with single PMI): RI, wCQI, sCQI, PMI

A feedback timing of each piece of information for the four feedback modes is determined by values of $N_{pd}$, $N_{OFFSET,CQI}$, $M_{RI}$, $N_{OFFSET,RI}$, etc., which are transmitted as higher layer signals. In the feedback mode 1-0, the transmission period of wCQI is $N_{pd}$, and the feedback timing is determined by subframe offset value of $N_{OFFSET,CQI}$. Also, the transmission period of RI is $N_{pd} \cdot M_{RI}$ and the offset is $N_{OFFSET,CQI} + N_{OFFSET,RI}$.

Figure 2:
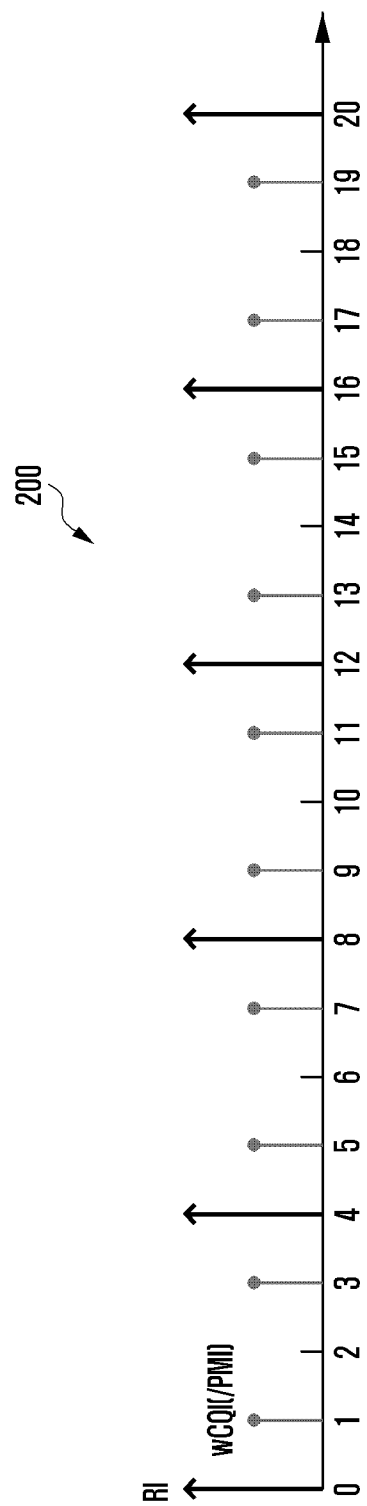
FIG. 2 illustrates feedback timings of a rank indicator (RI) and wideband channel quality indicator (wCQI)

FIG. 2 illustrates feedback timings of an RI and wCQI.

Referring to FIG. 2, feedback timing 200 are illustrated for RI and wCQI, when $N_{pd}=2$, $M_{RI}=2$, $N_{OFFSET,CQI}=1$, and $N_{OFFSET,RI}=-1$. In FIG. 2, each timing represents a subframe index.

The feedback mode 1-1 has the same feedback timing as a feedback mode 1-0, but is different in that wCQI and PMI are transmitted together at the wCQI transmission timings.

In the feedback mode 2-0, the feedback period for sCQI is $N_{pd}$ and the offset value is $N_{OFFSET,CQI}$. The feedback period for wCQI is H·Np and the offset value is $N_{OFFSET,CQI}$ as the offset values of sCQI. Here, H=J·K+1, where K is transmitted as a higher layer signal and J is a value determined by a system bandwidth.

For example, the value of J for a 10 MHz system is defined as "3". As a result, the wCQI is transmitted by replacing the value of J once every H sCCI transmissions. The period of RI is $M_{RI} \cdot H \cdot N_{pd}$, and the offset thereof is $N_{OFFSET,CQI} + N_{OFFSET,RI}$.

Figure 3:
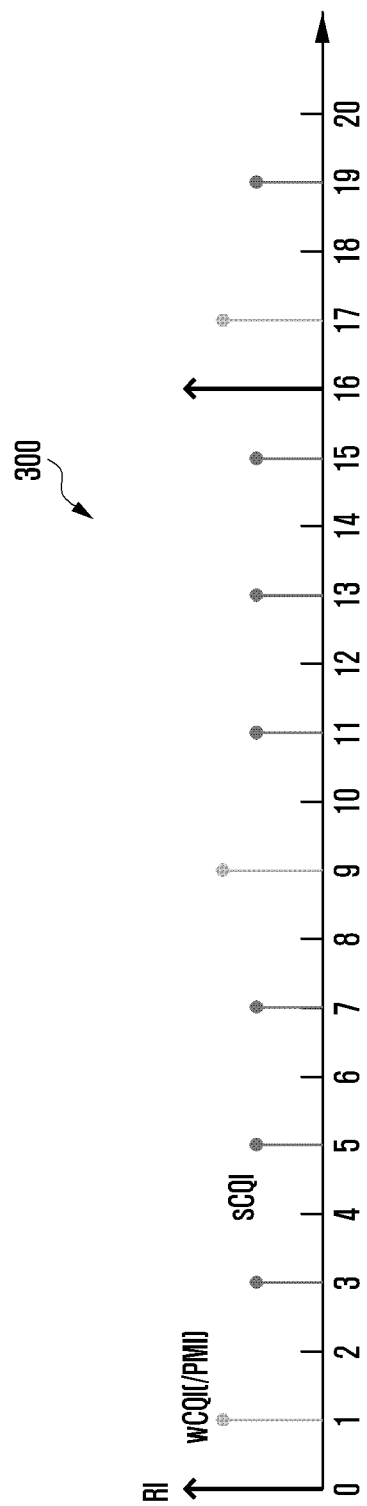
FIG. 3 illustrates feedback timings of an RI, subband CQI (sCQI), and wCQI.

FIG. 3 illustrates feedback timings of an RI, sCQI, and wCQI.

Referring to FIG. 3, RI, sCQI, and wCQI feedback timings 300 are illustrated, when $N_{pd}=2$, $M_{RI}=2$, J=3 (10 MHz), K=1, $N_{OFFSET,CQI}=-1$, and $N_{OFFSET,RI}=-1$.

The feedback mode 2-1 has the same feedback timing as the feedback mode 2-0, but is different in that PMI is transmitted together at the wCQI transmission timings.

The above-described feedback timing corresponds the number of CSI-RS antenna ports being 4 or less. When a UE is allocated with a CSI-RS for 8 antenna ports, two pieces of PMI information should be fed back, unlike the above-described feedback timing.

For 8 CSI-RS antenna ports, the feedback mode 1-1 is again divided into two submodes. In a first submode, an RI is transmitted with first PMI information, and second PMI information is transmitted with wCQI. The feedback period and offset for wCQI and the second PMI are defined as $N_{pd}$ and $N_{OFFSET,CQI}$, and the feedback period and offset value for the RI and the first PMI information are defined as $M_{RI} \cdot N_{pd}$ and $N_{OFFSET,CQI} + N_{OFFSET,RI}$, respectively. If a precoding matrix corresponding to the first PMI is W1 and a precoding matrix corresponding to the second PMI is W2, a UE and an eNB share information that the precoding matrix preferred by the UE is determined to be W1W2.

For the feedback mode 2-1 and 8 CSI-RS antenna ports, feedback of PTI information is added. The PTI is fed back with the RI, the period of the PTI is $M_{RI} \cdot H \cdot N_{pd}$, and the offset thereof are defined as $N_{OFFSET,CQI} + N_{OFFSET,RI}$. If the PTI is 0, the first PMI, the second PMI, and the wCQI are all fed back, and the wCQI and the second PMI are transmitted together.

The period of the second PMI is $N_{pd}$ and the offset thereof is given as $N_{OFFSET,CQI}$. The period of the first PMI is $H' \cdot N_{pd}$ and the offset thereof is $N_{OFFSET,CQI}$. Here, H' is transmitted as a higher layer signal. However, when the PTI is "1", the PTI is transmitted with the RI, the wCQI and the second PMI are transmitted together, and the sCQI is fed back at a separate timing. In this case, the first PMI is not transmitted. The periods and offsets of the PTI and RI are the same as those when the PTI is "0", and the period of sCQI is defined as $N_{pd}$ and the offset thereof is defined as $N_{OFFSET,CQI}$. The wCQI and the second PMI are fed back while having the period of $H \cdot N_{pd}$ and the offset of $N_{OFFSET,CQI}$, and H is defined as the number of CSI-RS antenna ports is "4".

Figure 4:
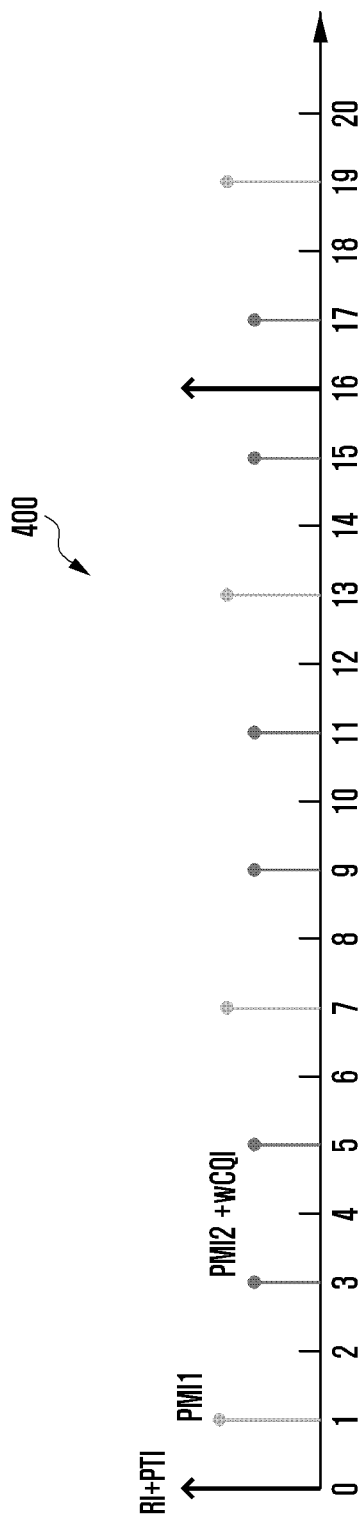
FIG. 4 illustrates feedback timing, when a precoding type indicator (PTI)=0.

FIG. 4 illustrates feedback timing, when a PTI=0.

Referring to FIG. 4, a feedback timing 400 illustrated, when PTI=0, $N_{pd}=2$, $M_{RI}=2$, J=3 (10 MHz), K=1, H'=3, $N_{OFFSET,CQI}=1$, and $N_{OFFSET,RI}=-1$.

Figure 5:
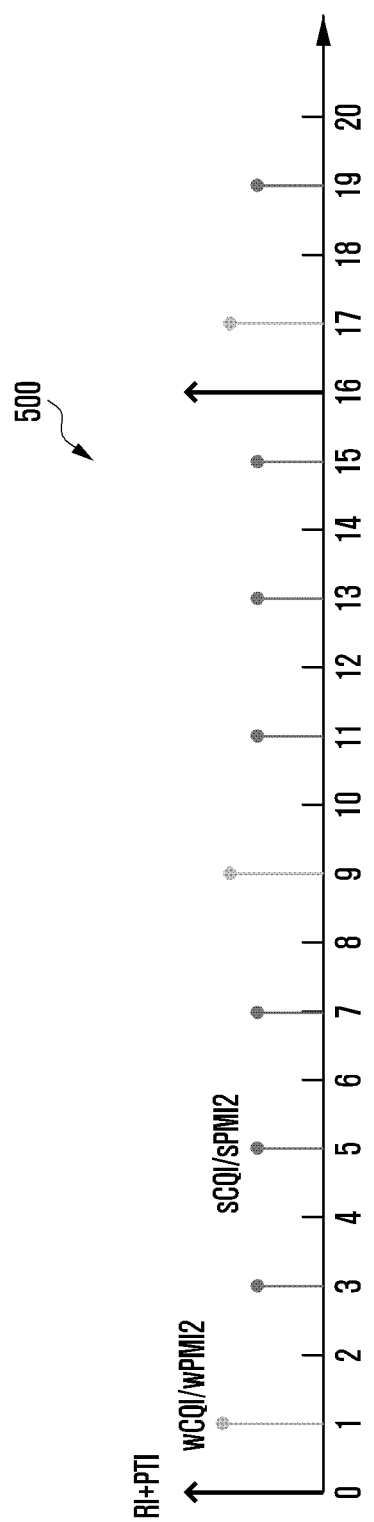
FIG. 5 illustrates feedback timing, when PTI=1.

FIG. 5 illustrates feedback timing, when PTI=1.

Referring to FIG. 5, a feedback timing 500 is illustrated, when PTI=1, $N_{pd}=2$, $M_{RI}=2$, J=3 (10 MHz), K=1, H'=3, $N_{OFFSET,CQI}=1$, and $N_{OFFSET,RI}=-1$.

Figure 6:
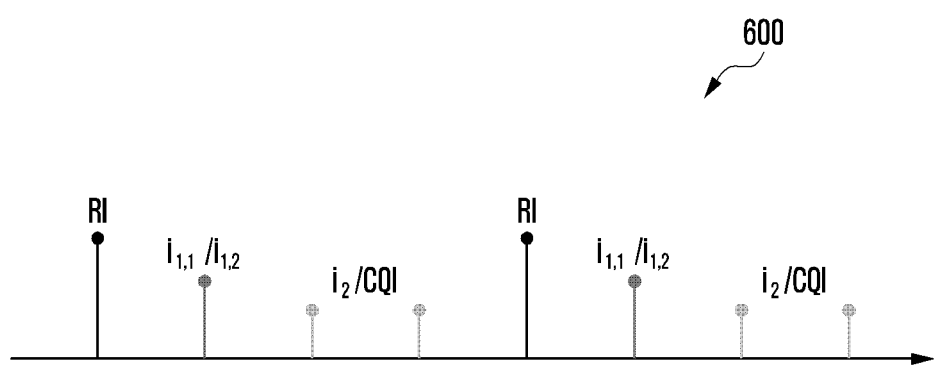
FIG. 6 illustrates periodic CSI reporting supported by terminals in which channel state information reference signals (CSI-RSs) of 12 ports or more are set in LTE Release 13 and Release 14.

FIG. 6 illustrates periodic CSI reporting supported by terminals in which CSI-RSs of 12 ports or more are set in LTE Release 13 and Release 14. Specifically, FIG. 6 illustrates a time point of periodic CSI reporting for CSI-RS ports of 12 ports or more for two-dimensional (2D) array antennas supported by LTE Release 13 and Release 14.

The LTE Release 13 and Release 14 support a NP CSI-RS to support the CSI-RS ports of 12 ports or more for 2D array antennas. In the NP CSI-RS, 8, 12, 16, or more CSI-RS ports are supported by utilizing positions for the existing CSI-RS in one subframe. The corresponding field is set in CSI-RS-ConfigNZP-EMIMO. A UE can use the set field to identify and receive the position for CSI-RS resource. In a BF CSI-RS, individual CSI-RS resources, in which the number of CSI-RS ports, the subframe, and the codebook subset restriction may be different from each other, are bundled and used as a BF CSI-RS, by using csi-RS-ConfigNZPIdListExt-r13 and csi-IM-ConfigidListExt-r13.

In order to support the 20 antennas in the NP CSI-RS, a new 2D codebook is required, which may vary depending on dimensional antennas, oversampling factor, and codebook setting. Based on analysis of PMI bits of the 20 codebook, upon identification of bits for i2 (W2) reporting, the existing CSI reporting method is available with less than 4 bits. However, for i11 and i12 (corresponding to W11 and W12 in Table 8 below), PMI bits are increased for N1, N2, O1, O2, and codebookConfig, which are supported as shown in Table 8, as follows.

TABLE 8

PMI overhead analysis of 2D codebook

| $(N_1, N_2)$ | $(O_1, O_2)$ combinations |
|---|---|
| (8, 1) | (4, —) (8, —) |
| (2, 2) | (4, 4) (8, 8) |
| (2, 3) | {(8, 4) (8, 8)} |
| (3, 2) | {(8, 4) (4, 4)} |
| (2, 4) | {(8, 4) (8, 8)} |
| (4, 2) | {(8, 4) (4, 4)} |

| | | Config = 1 | | | | | Config = 2, 3, 4 | | |
|---|---|---|---|---|---|---|---|---|---|
| $(N_1, N_2)$ | $(O_1, O_2)$ | $W_{1,1}/W_{1,2}$ bits | $(O_1, O_2)$ | $W_{1,1}/W_{1,2}$ bits | $(N_1, N_2)$ | $(O_1, O_2)$ | $W_{1,1}/W_{1,2}$ bits | $(O_1, O_2)$ | $W_{1,1}/W_{1,2}$ bits |
| (8, 1) | (4, —) | 5 + 2(additional for rank 3, 4) | (8, —) | 6 + 2 | (8, 1) | (4, —) | 4 + 2 | (8, —) | 5 + 2 |
| 2, 2) | (4, 4) | 3 + 1/3 | (8, 8) | 4 + 1/4 | (2, 2) | (4, 4) | 2 + 1/2 | (8, 8) | 3 + 1/3 |
| (2, 3) | (8, 4) | 4 + 1/4 | (8, 8) | 4 + 1/5 | (2, 3) | (8, 4) | 3 + 1/3 | (8, 8) | 3 + 1/4 |
| (3, 2) | (8, 4) | 5 + 1/3 | (4, 4) | 4 + 1/3 | (3, 2) | (8, 4) | 4 + 1/2 | (4, 4) | 3 + 1/2 |
| (2, 4) | (8, 4) | 4 + 1/4 | (8, 8) | 4 + 1/5 | (2, 4) | (8, 4) | 3 + 1/3 | (8, 8) | 3 + 1/4 |
| (4, 2) | (8, 4) | 5 + 1/3 | (4, 4) | 4 + 1/3 | (4, 2) | (8, 4) | 4 + 1/2 | (4, 4) | 3 + 1/2 |

Based on Table 8, i1 should transmit a maximum of 10 bits when (N1, N2, O1, O2)=(2, 4, 8, 8) and Config is "1". In a PUCCH format 2 used for the existing periodic CSI reporting, a Reed-Muller code used for channel coding can be transmitted up to 13 bits. However, for an extended cyclic prefix (CP), since 2 bits of HARQ ACK/NACK are supported, a payload size that can actually be transmitted in a normal CP situation is 11 bits. To support this payload size, the corresponding reporting is performed using three independent CSI reporting time points 600, as shown in FIG. 6, in both a wCQI mode and an sCQI mode.

LTE supports periodic feedback of the UE and aperiodic feedback of the UE. When an eNB desires to acquire aperiodic feedback information of a specific UE, the eNB sets an aperiodic feedback indicator included in DL control information (DCI) for UL data scheduling of the UE in order to instruct specific aperiodic feedback, thereby performing UL data scheduling of the UE. When the UE receives the indicator set to perform aperiodic feedback in an n-th subframe, the UE performs UL transmission including aperiodic feedback information in data transmission in an (n+k)-th subframe, where k is a parameter defined in 3GPP LTE Release 11 standard, which is "4" in frequency division duplexing (FDD) and is defined as shown in Table 9 below in time division duplexing (TDD).

If the aperiodic feedback is set, the feedback information includes RI, PMI, and CQI, like when the periodic feedback is set, and RI and PMI may not be fed back according to the feedback setting. The CQI may include both wCQI and sCQI or may include only wCQI information.

In addition, LTE also provides a codebook subsampling function for periodic CSI reporting. In LTE, the periodic feedback of the UE is transmitted to the eNB via the PUCCH. Because an amount of information that can be transmitted at one time through the PUCCH is limited, various feedback objects, such as RI, wCQI, sCQI, PMI1, wPMI2, and sPMI2 may be transmitted on the PUCCH through subsampling, or two or more pieces of feedback information may be jointly encoded together and transmitted on the PUCCH.

For example, when the number of CSI-RS ports set by the eNB is 8, an RI and a PMI1 reported in a submode 1 of a PUCCH mode 1-1 can be jointly encoded as shown in Table 10 below.

Based on Table 10, the RI including 3 bits and the PMI1 including 4 bits are jointly encoded with 5 bits in total.

A submode 2 of the PUCCH mode 1-1 jointly encodes a PMI1 including 4 bits and a PMI2 including 4 bits as a total of 4 bits as shown in Table 11 below. Because the subsampling level is larger than that of the submode 1 (in submode 1, 7 bits are subsampled to 5 bits, and in submode 2, 8 bits are subsampled to 4 bits), it is impossible to report more precoding indexes.

As another example, when the number of CSI-RS ports set by the eNB is 8, a PMI2 reported in a PUCCH mode 2-1 can be subsampled as shown in Table 12 below.

Referring to Table 12, the PMI2 is reported as 4 bits when the number of the associated RIs is "1". However, if the number of associated RIs is "2" or greater, a differential CQI for a second codeword should be reported together, so that the PMI2 is subsampled with 2 bits and reported.

TABLE 9

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

TABLE 10

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1} - 8)$ |
| 16-17 | 3 | $2(I_{RI/PMI1} - 16)$ |
| 18-19 | 4 | $2(I_{RI/PMI1} - 18)$ |
| 20-21 | 5 | $2(I_{RI/PMI1} - 20)$ |
| 22-23 | 6 | $2(I_{RI/PMI1} - 22)$ |
| 24-25 | 7 | $2(I_{RI/PMI1} - 24)$ |
| 26 | 8 | 0 |
| 27-31 | reserved | NA |

TABLE 11

| RI | Relationship between the first PMI value and codebook index $i_1$ | | Relationship between the second PMI value and codebook index $i_2$ | | total #bits |
|---|---|---|---|---|---|
| | Value of the first PMI $I_{PMI1}$ | Codebook index $i_1$ | Value of the second PMI $I_{PMI2}$ | Codebook index $i_2$ | |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4 \lfloor I_{PMI2}/4 \rfloor + I_{PM}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 6 | 0 | 6 |

TABLE 12

| RI | Relationship between the second PMI value and codebook index $i_2$ | |
|---|---|---|
| | Value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Figure 7:
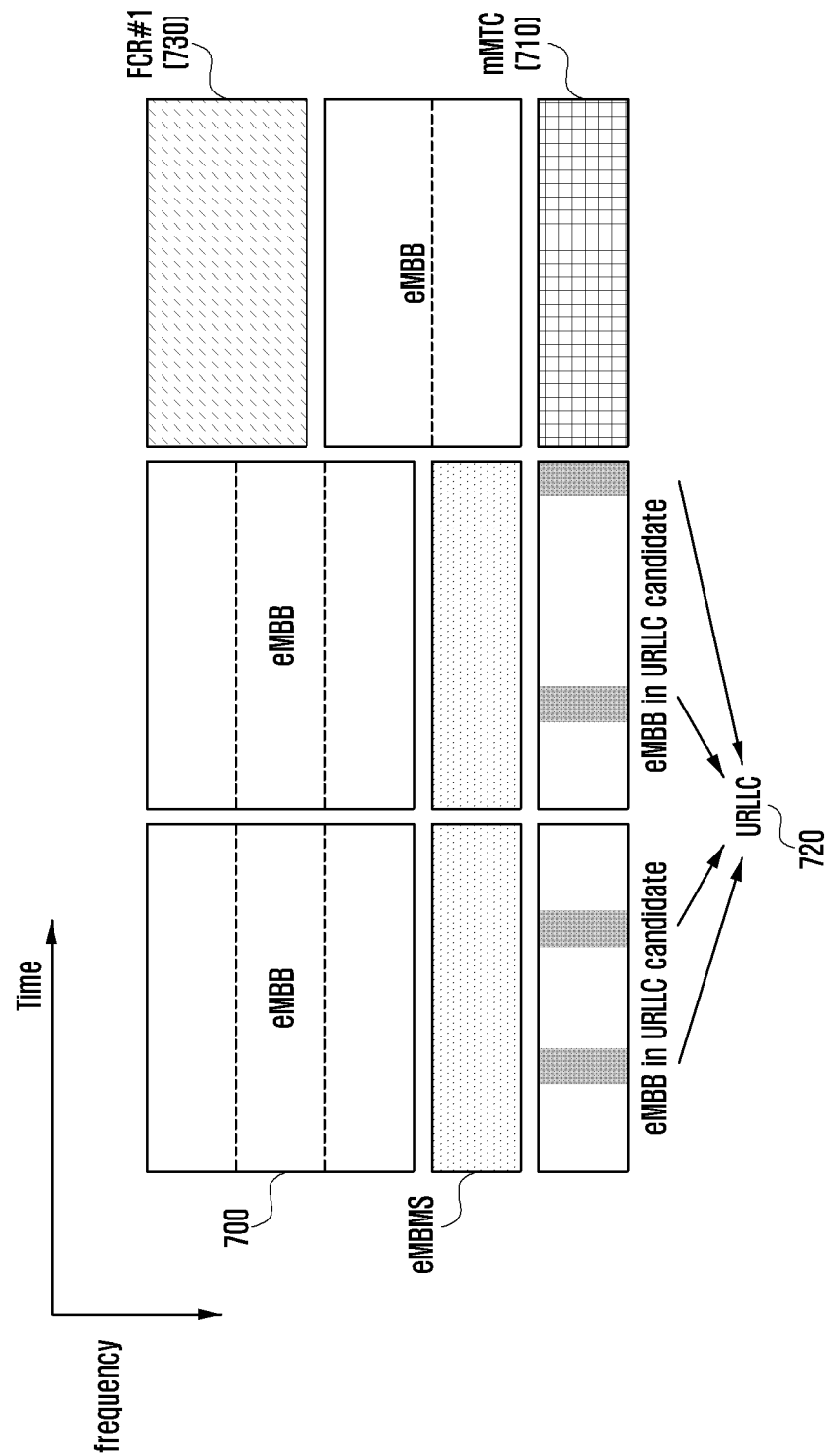
FIG. 7 illustrates a radio resource configuration of data in an NR system.

FIG. 7 illustrates a radio resource configuration of data in an NR system. Specifically, FIG. 7 illustrates an example in which data, such as eMBB, URLLC, and mMTC, which are services considered in an NR system, is allocated in a frequency-time resource with a forward compatible resource (FCR).

Referring to FIG. 7, when URLLC data 720 is to be generated and transmitted while eMBB data 700 and mMTC data 710 are allocated in a specific frequency band and transmitted, a portion in which the eMBB data 700 and the mMTC data 710 are allocated in advance is emptied, and then the URLLC data 720 is transmitted. Because the URLLC is particularly important for a short delay time, the URLLC data can be allocated to a portion of resources allocated with the eMBB data, and as such, eMBB resources can be informed to a UE in advance. The eMBB data does not have to be transmitted in frequency-time resources where the eMBB data and the URLLC data overlap, and thus, the transmission performance of the eMBB data may be lowered. That is, in the above case, eMBB data transmission failure due to URLLC allocation may occur. At this time, a length of a transmission time interval (TTI) used for the URLLC transmission may be shorter than a length of the TTI used for the eMBB or mMTC transmission. An FCR 730 may also be allocated in frequency-time resources.

A synchronization signal is used to acquire synchronization with a cell in a network in a process in which a UE is connected to a wireless communication system. The synchronization signal refers to a reference signal transmitted by an eNB for time and frequency synchronization and cell search at an initial connection of the UE. In LTE, a signal, such as an primary synchronization signal (PSS) or a secondary synchronization signal (SSS), may be transmitted for synchronization.

Figure 8:
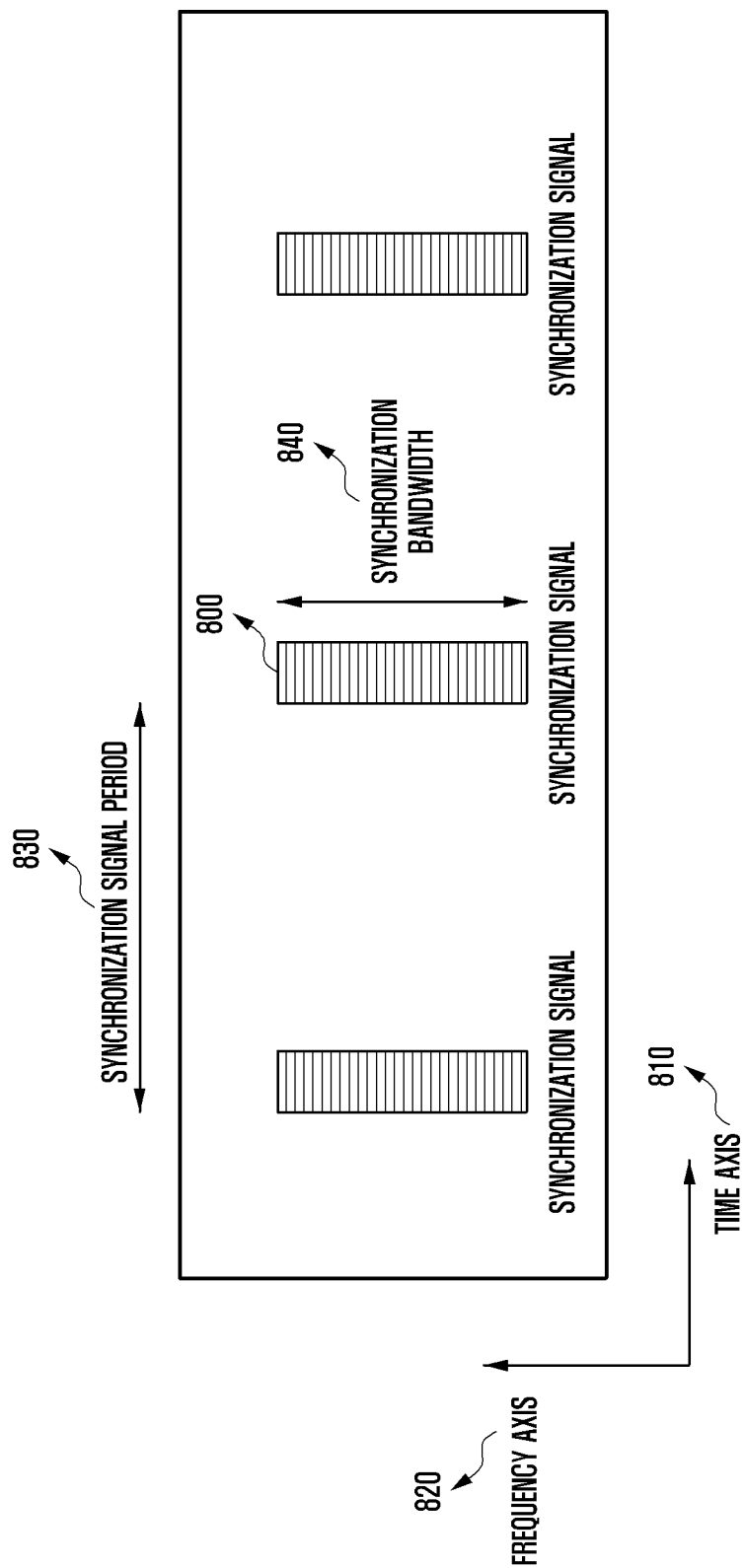
FIG. 8 illustrates a synchronization signal transmitted in a 5G communication system according to an embodiment.

FIG. 8 illustrates a synchronization signal transmitted in a 5G communication system according to an embodiment.

Referring to FIG. 8, a synchronization signal 800 may be transmitted every predetermined period 830 on a time axis 810. The synchronization signal 800 may also be transmitted within a certain synchronization signal transmission bandwidth 840 on a frequency axis 820. The synchronization signal may be obtained by mapping a special sequence to a subcarrier within the transmission bandwidth 840 to indicate a cell identifier (ID). A cell ID may be mapped in a combination of one or a plurality of sequences, and a UE may detect the ID of a cell to which the UE desires to connect by detecting the sequence used for the synchronization signal. A sequence having a constant amplitude zero auto correlation (CAZAC) characteristic, such as a Zadoff-Chu sequence or a Golay sequence, or a pseudo random noise sequence, such as an M-sequence or a gold sequence, may be used as the sequence used for the synchronization signal.

The synchronization signal 800 may be configured using one OFDM symbol or multiple OFDM symbols. When the synchronization signal 800 is configured using multiple OFDM symbols, a sequence for a plurality of different synchronization signals may be mapped to each OFDM symbol. For example, in a similar manner as that in LTE, three Zadoff-Chu sequences can be used to generate a PSS and a gold sequence is used to generate an SSS.

A PSS of one cell may have three different values according to a physical layer cell ID of the cell, and three cell IDs of one cell ID group correspond to different PSSs. Accordingly, the UE may detect the PSS of the cell and may identify one cell ID group of the three cell ID groups supported by the LTE. The UE additionally detects an SSS among 168 cell IDs, reduced from 504 cell IDs, through the cell ID group identified through the PSS, and thereafter, obtains a cell ID to which the corresponding cell belongs.

As described above, the UE acquires synchronization with a cell in the network, acquires a cell ID, and identifies a cell frame timing. If this process is successful, the UE may receive cell system information. The cell system information is repeatedly broadcasted by the network and is information that the UE should know in order for the UE to be connected to the cell and for the UE to operate properly within the cell.

In LTE, system information is transmitted through two different transmission channels. A limited amount of system information called a master information block (MIB) is transmitted using a PBCH, and main part of the system information corresponding to a system information block (SIB) is transmitted using a PDSCH.

More specifically, in the LTE system, the system information included in the MIB includes a DL transmission bandwidth, a physical hybrid ARQ indicator channel (PHICH) setting information, and a system frame number (SFN).

Figure 9:
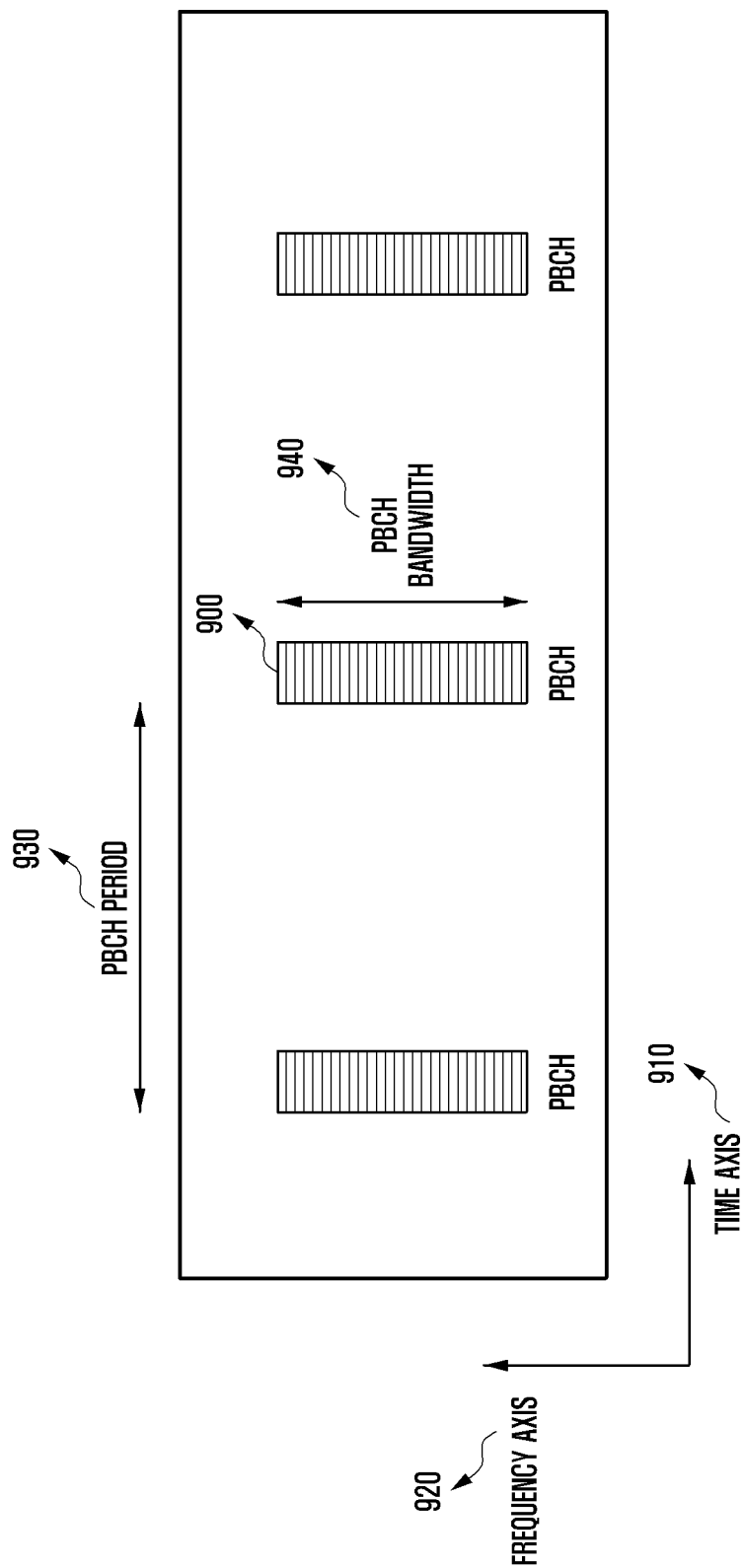
FIG. 9 illustrates a physical broadcast channel (PBCH) transmitted in a 5G communication system according to an embodiment.

FIG. 9 illustrates a PBCH transmitted in a 5G communication system according to an embodiment.

Referring to FIG. 9, a PBCH 900 may be transmitted every predetermined period 930 on a time axis 910. The PBCH 900 may also be transmitted within a constant PBCH transmission bandwidth 940 on a frequency axis 920. To improve coverage, the same signal may be transmitted to the PBCH every predetermined period 930, and a UE may combine and receive the signals. In addition, a transmission scheme, such as transmission diversity (TxD) or one DMRS port-based precoder cycling, is applied using a plurality of antenna ports for PBCH transmission, so that a diversity gain may be obtained without any additional information about the transmission scheme used at a reception terminal. Although the PBCH is illustrated in FIG. 9, the present disclosure is not limited thereto.

Similar to the current LTE system, the PBCH 900 may be configured using a plurality of OFDM symbols in time-frequency domain resources or may be scattered over time-frequency domain resources. The UE should receive and decode the PBCH to receive the system information. In the LTE system, the UE performs channel estimation on the PBCH using the CRS.

Figure 10:
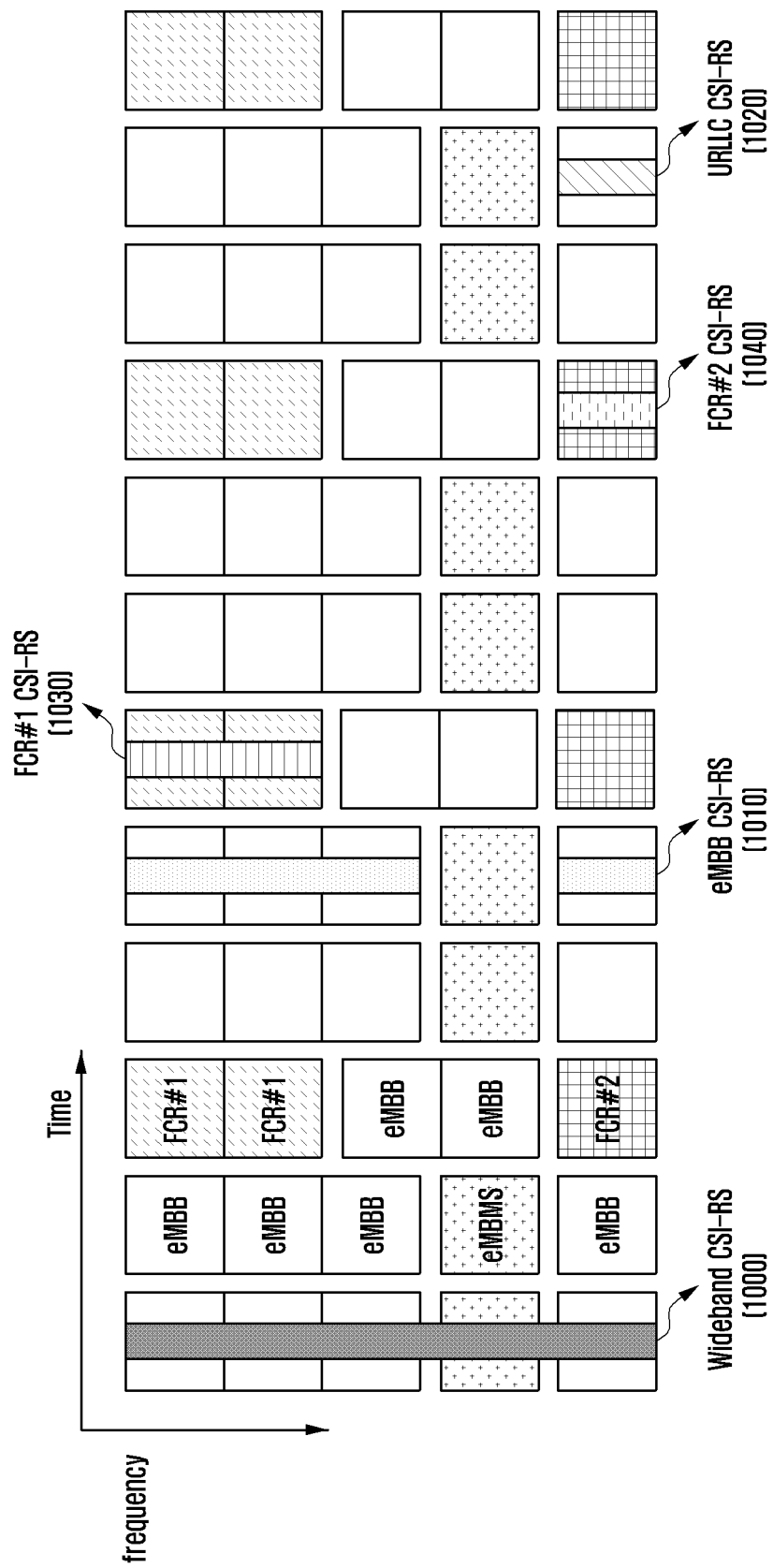
FIG. 10 illustrates services multiplexed in time and frequency resources in an NR system according to an embodiment.

FIG. 10 illustrates services multiplexed in time and frequency resources in an NR system according to an embodiment.

Referring to FIG. 10, an eNB may allocate a CSI-RS to a wideband or a multi-band to secure initial channel state information to a UE. The full-band or multi-band CSI-RS (wideband CSI-RS) 1000 uses a large amount of reference signal overhead, which can be disadvantageous for optimizing the system performance. However, if there is no previously obtained information, the full-band or multi-band CSI-RS may be essential.

After the CSI-RS transmission in the full-band or the multi-band, each service may be provided with different requirements for each service, and thus, accuracy and update necessity of channel state information can also be changed. Accordingly, after securing the initial channel state information, the eNB may trigger transmission of subband CSI-RSs 1010, 1020, 1030, and 1040 for each service in the corresponding band according to the need for each service. Although FIG. 10 illustrates transmission of a CSI-RS for each service at one time point, alternatively, a CSI-RS for a plurality of services can be transmitted as needed.

Compared with the above-mentioned CSI-RS transmission and CSI reporting setting of LTE, the form of CSI-RS transmission and CSI reporting setting supported by the NR may be different. Unlike LTE, the NR may support more flexible CSI reporting setting than LTE through resource setting, CSI measurement setting, and CSI reporting setting to support a CSI reporting.

Figure 11:
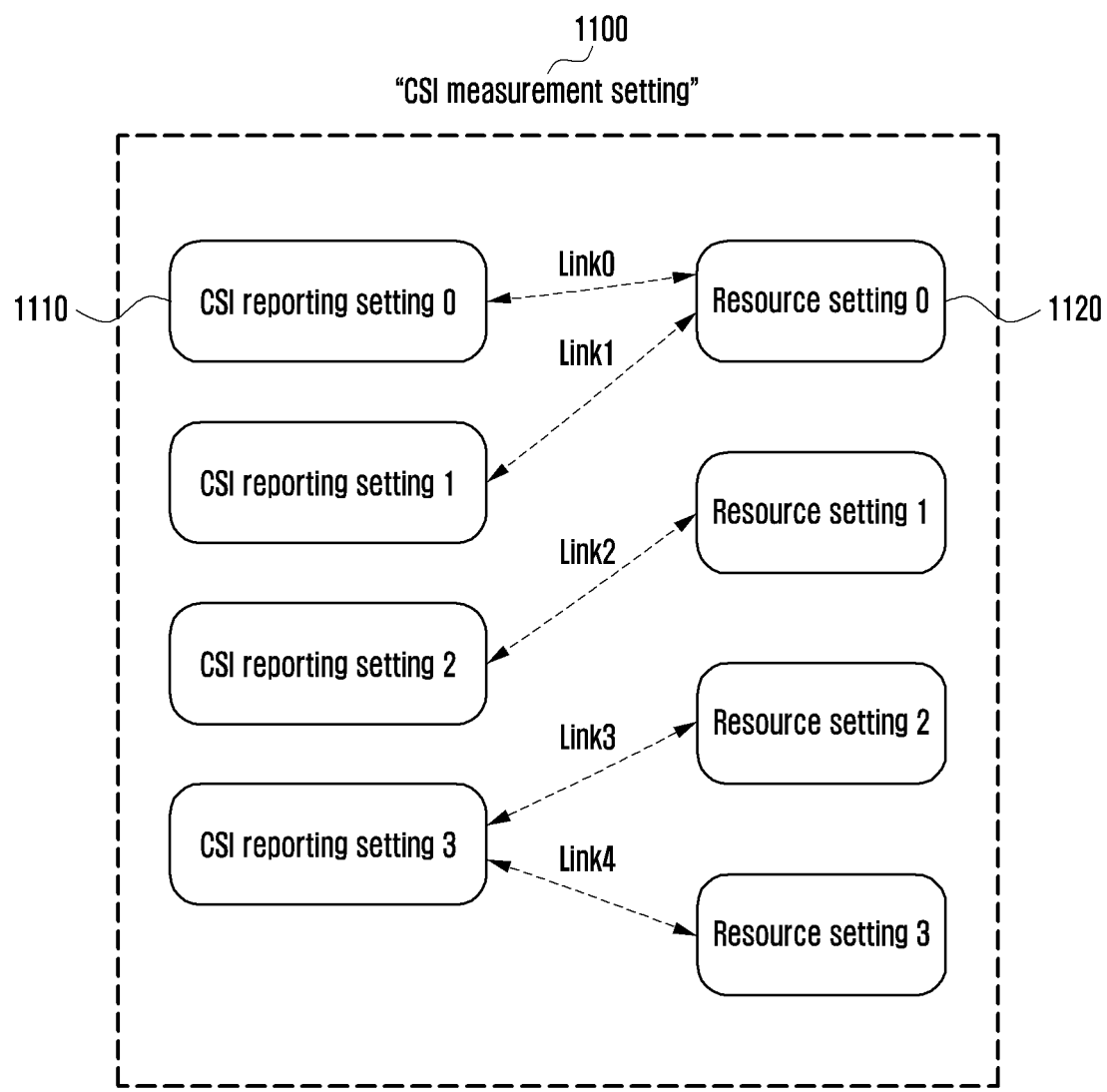
FIG. 11 illustrates a resource setting, a CSI measurement setting, and a CSI reporting setting for supporting CSI reporting in an NR according to an embodiment.

FIG. 11 illustrates a resource setting, a CSI measurement setting, and a CSI reporting setting for supporting CSI reporting in an NR according to an embodiment.

Referring to FIG. 11, the resource setting, the CSI measurement setting, and the CSI reporting setting may include the following setting information.

CSI reporting setting 1110: Whether to report reporting parameters (e.g., RI, PMI, CQI, etc.) for a CSI reporting, etc., can be set. In addition, the type (e.g., Type I {CSI reporting having low resolution and implicit reporting type} or Type II {CSI reporting having high resolution and type of explicitly reporting eigenvector, covariance matrix, etc., using a CSI reporting in a linear combination form}) of the CSI reporting can be set. Specifically, the CSI reporting setting may support whether to report RI, PMI, CQI, BI or CRI (setting for whether to report is possible by individual setting or combined setting), a reporting method (periodic, aperiodic, and semi-persistent setting are possible, and aperiodic and semi-persistent setting can be set as one parameter), codebook setting information, PMI type (wideband or partial band), a CSI reporting type (implicit/explicit or Type I/Type II), a channel quality reporting type (CQI or RSRP), and resource setting for CSI reporting.

Resource setting 1120: Setting including setting information for a reference signal for channel state measurement. CSI-RS resources for channel measurement and CSI-IM (IMR) resources for interference measurement can be set, and a plurality of resource settings may exist for this purpose. In addition, the transmission type (periodic, aperiodic, and semi-persistent) of the reference signal, the transmission period and offset of the reference signal, etc., can be set.

CSI measurement setting 1100: Establishes a mapping or connection between the CSI reporting setting and the resource setting. For example, if there are N CSI reporting settings and M resource settings, L links establishing the mapping between the plurality of CSI reporting settings and the resource settings may be included in the CSI measurement setting. In addition, association setting (e.g., if the reference signal is transmitted in n subframes or slots, the reporting time point can be set using parameters such as $D_{0-0}$, $D_{1-0}$, $D_{2-1}$, $D_{3-2}$ and $D_{3-3}$, and thereby the reporting time point can be defined as $n+D_{0-0}$).

In addition to periodic and aperiodic CSI reportings supported by LTE, the NR supports semi-persistent reference signal transmission and channel state information.

At this time, the periodic and semi-persistent channel state information of the NR may not support subband reporting in the above-mentioned reporting mode. A PUCCH used in periodic and semi-persistent CSI reporting has a limited amount of reporting that can be transmitted. Therefore, as described above, LTE allows a UE to select a partial subband among the bandwidth part and to report the channel state. However, because a reporting on such a selective subband contains very limited information, the utility of the corresponding information is not great. Therefore, by not supporting such reporting, the complexity of the UE can be reduced and the efficiency of the reporting can be increased. In addition, because the subband reporting is not supported, the periodic channel state information reporting of the NR may not report a PMI, or may transmit only one PMI corresponding to wideband or partial band.

The aperiodic channel state information reporting of the NR can support the following reporting modes.

Reporting mode 1-2 (wideband CQI with multiple PMI): RI, wCQI, a plurality of broadband and narrowband PMIs Reporting mode 2-0 (subband CQI with no PMI): RI, wCQI, sCQI of a band selected by UE Reporting mode 2-2 (subband CQI with multiple PMIs): RI, wCQI, sCQI, a plurality of broadband and narrowband PMIs Reporting mode 3-0 (subband CQI with no PMI): RI, wCQI, sCQI of wideband Reporting mode 3-2 (subband CQI with multiple PMIs): RI, wCQI, sCQI of wideband, a plurality of broadband and narrowband PMIs Similar to the periodic CSI reporting, the reporting modes 2-0 and 2-2 select and report one of the subbands of the bandwidth part of the UE, and the efficiency of the reporting is low, so that the reporting may not be supported in the NR. In the periodic CSI reporting in the LTE, the reporting mode is determined using PMI/RI reporting setting and CQI setting of the corresponding CSI reporting mode setting.

In the aperiodic CSI reporting, the CSI reporting mode is directly set. In the NR, the reporting mode can be provided with the PMI/RI reporting setting and the CQI reporting setting included in the above-mentioned CSI reporting setting.

As described above, the NR supports two types of CSI reporting with low spatial resolution and high spatial resolution as follows. Table 13 and Table 14 below show the two types of CSI reportings, and Table 15 and Table 16 show reporting overhead for each reporting type.

TABLE 13

Type 1 single panel codebook

For two CSI-RS ports, NR supports the following Type 1 codebook $$W \in \left\{ \frac{1}{\sqrt{2}} \begin{bmatrix} 1 \\ e^{j\frac{\pi n}{2}} \end{bmatrix}, n = 0, 1, 2, 3 \right\}$$

for rank-1 and $$\left\{ \frac{1}{2} \begin{bmatrix} 1 & 1 \\ j^n & -j^n \end{bmatrix}, n = 0, 1 \right\}$$

for rank-2

For 4 CSI-RS ports or more, NR supports Type 1 codebooks for ranks 1 through 8 below It is assumed that a codebook has a $W = W_1 W_2$ precoder structure. Here, $$W_1 = \begin{bmatrix} B & 0 \\ 0 & B \end{bmatrix}$$

is satisfied. B consists of L oversampled 2D discrete Fourier transform (DFT) beams. As to the rank 1 and the rank 2, a value of L may be set to one of L ∈ {1,4}. $W_2$ performs beam selection (only when L = 4) and performs quadrature phase shift keying (QPSK) co-phasing between two polarizations.

1D/2D antenna port layouts $N_1$ and $N_2$ and oversampling factors $O_1$ and $O_2$ (cf. Rel. 13/14 LTE class A codebooks) are supported as follows:

| Number of CSI-RS ports | $(N_1, N_2)$ | $(O_1, O_2)$ |
|---|---|---|
| 4 | (2, 1) | (4, —) |
| 8 | (2, 2) | (4, 4) |
|   | (4, 1) | (4, —) |
| 12 | (3, 2) | (4, 4) |
|    | (6, 1) | (4, —) |
| 16 | (4, 2) | (4, 4) |
|    | (8, 1) | (4, —) |
| 24 | (6, 2), (4, 3) | (4, 4) |
|    | (12, 1) | (4, —) |
| 32 | (8, 2), (4, 4) | (4, 4) |
|    | (16, 1) | (4, —) |

As to L = 4, beam group (B) patterns as illustrated in FIG. 30 are supported.

TABLE 14

Type 2 single panel codebook

NR supports Type 2 Cat 1 CSI for ranks 1 and 2
PMI is used for spatial channel information feedback
The UE assumes the following precoder structure for a PMI codebook for CSI reporting.

For rank 1:
$$W = \begin{bmatrix} \tilde{w}_{0,0} \\ \tilde{w}_{1,0} \end{bmatrix} = W_1 W_2,$$

W is normalized to 1

For rank 2:
$$W = \begin{bmatrix} \tilde{w}_{0,0} & \tilde{w}_{0,1} \\ \tilde{w}_{1,0} & \tilde{w}_{1,1} \end{bmatrix} = W_1 W_2,$$

columns of W are normalized to $$\frac{1}{\sqrt{2}} \cdot \tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$$

(weighted combination of L beams)

A value of L can be set as one value of L ∈ {2,3,4}.
$b_{k_1, k_2}$ is an oversampled 2D DFT beam.
r = 0,1 (polarization), l = 0,1 (layer)
$p_{r,l,i}^{(WB)}$: wideband beam (WB) amplitude scaling factor for beam i, polarization TABLE 14-continued Type 2 single panel codebook r, and layer 1
 $p_{r,l,i}^{(SB)}$: subband beam (SB) amplitude scaling factor for beam i, polarization r, and layer 1
 $c_{r,l,i}$: beam coupling coefficient (phase) for beam L polarization r, and layer 1, which is set by selecting either QPSK (2 bits) or 8PSK (3 bits)
 Amplitude scaling mode: set by selecting either WB + SB (unequal bit allocation) or WB-only

TABLE 15

| Number of CSI-RS ports | $(N_1, N_2)$ | $(O_1, O_2)$ | i1 Payload (L = 1) | i1 Payload (L = 4) | i2 payload |
|---|---|---|---|---|---|
| 4 | (2, 1) | (4, —) | 3 bits | 2 bits | For rank1, |
| 8 | (2, 2) | (4, 4) | 6 bits | 4 bits | 2 bits for L = 1, |
|   | (4, 1) | (4, —) | 4 bits | 3 bits | 4 bits for L = 4 |
| 12 | (3, 2) | (4, 4) | 7 bits | 5 bits | For rank2, |
|   | (6, 1) | (4, —) | 4 bits | 3 bits | Additional 2 |
| 16 | (4, 2) | (4, 4) | 7 bits | 5 bits | bits |
|   | (8, 1) | (4, —) | 5 bits | 4 bits | for i1, |
| 24 | (6, 2), | (4, 4) | 8 bits | 6 bits | 1 bits for L = 1, |
|   | (4, 3) |   |   |   |   |
|   | (12, 1) | (4, —) | 6 bits | 5 bits | 3 bits for L = 4 |
| 32 | (8, 2), | (4, 4) | 8 bits | 6 bits |   |
|   | (4, 4) |   |   |   |   |
|   | (16, 1) | (4, —) | 6 bits | 5 bits |   |

Table 16 below shows reporting overhead for type 2 CSI reporting. More specifically, Table 16 shows an example in which $(N_1, N_2)=(4,4)$, Z=3(8PSK), and K leading coefficients are 4, 4, and 6, when L=2, 3, and 4, for size combination of WB and SB.

TABLE 16

| L | Rotation $\lceil \log_2(O_1 O_2) \rceil$ | L-beam selection | Strongest coefficient (1 out of 2L): $\lceil \log_2 2L \rceil$ per layer | WB amplitude 3 × (2L − 1) per layer | Total WB payload | SB amplitude (1SB): 1 × (K − 1) per layer | SB phase (1SB): Z × (K − 1) + 2 × (2L − K) per layer | Total payload |
|---|---|---|---|---|---|---|---|---|
| Rank 1 pay load (bits) | | | | | | | | |
| 2 | 4 | [7 or 8] | 2 | 9 | 22 | 3 | 9 | 142 |
| 3 | 4 | [10 or 12] | 3 | 15 | 32 | 3 | 13 | 192 |
| 4 | 4 | [11 or 16] | 3 | 21 | 39 | 5 | 19 | 279 |
| Rank 2 payload (bits) | | | | | | | | |
| 2 | 4 | [7 or 8] | 4 | 18 | 33 | 6 | 18 | 273 |
| 3 | 4 | [10 or 12] | 6 | 30 | 50 | 6 | 26 | 370 |
| 4 | 4 | [11 or 16] | 8 | 42 | 63 | 10 | 38 | 543 |

As described above, Type I CSI reporting can report the channel state to an eNB through RI, PMI, CQI, and CSI-RS resource indicator (CRI) based on codebook as in LTE. However, Type II reporting can provide a higher level of resolution through more PMI reporting overhead in addition to the implicit CSI, similar to the Type I reporting, and this PMI reporting can be generated by linear combination of precoder, beam, co-phase, etc., used in the Type I reporting.

In order to report a direct channel state, a CSI can be reported in the form of an explicit CSI, different from the conventional method. For example, the CSI reporting may include a method of reporting a covariance matrix of a channel.

A combination of implicit and explicit CSIs is also possible. For example, the PMI is associated with a covariance matrix of the channel, but in addition to this, the CQI or RI may be reported together.

As described above, Type II has high reporting overhead. Therefore, Type II reporting may not be suitable for periodic CSI reporting, where the number of reportable bits is not large. However, for aperiodic CSI reporting, because the CSI reporting is supported via a PUSCH, which can support high reporting overhead, Type II reporting requiring can be supported in the aperiodic CSI reporting.

In addition, semi-persistent CSI reporting can support Type II.

In an NR, semi-persistent CSI reporting supports dynamic activity and inactivity compared to the periodic CSI reporting, thereby requiring relatively higher UE complexity.

In CSI reporting of LTE, as described in Table 1, the eNB sets a reference signal and reporting-related settings through higher layer settings based on the CSI process, with respect to the UE. For periodic CSI reporting reports based on this, it is reported to a previously configured reporting timing and resources for reporting. For aperiodic CSI reporting, the eNB reports setting information, which is set in advance, through a trigger in a DCI transmitted through a DL control signal.

In the NR, as described above with reference to FIG. 11, the CSI reporting setting, the resource setting, and a link for linking the CSI reporting are included in the CSI measurement setting. For periodic and semi-persistent CSI reportings, the channel state can be reported periodically or semi-persistently by the CSI reporting setting according to RRC setting of the eNB and a DCI- or MAC CE-based activation or deactivation signal. For aperiodic CSI reporting, a CSI reporting can be triggered using method 1 or method 2, as shown below.

Aperiodic CSI reporting trigger method 1: trigger based on a link in the CSI measurement setting Aperiodic CSI reporting trigger method 2: trigger based on the CSI reporting setting in the CSI measurement setting The aperiodic CSI reporting trigger method 1 triggers a CSI reporting based on the link in the measurement setting.

Figure 12:
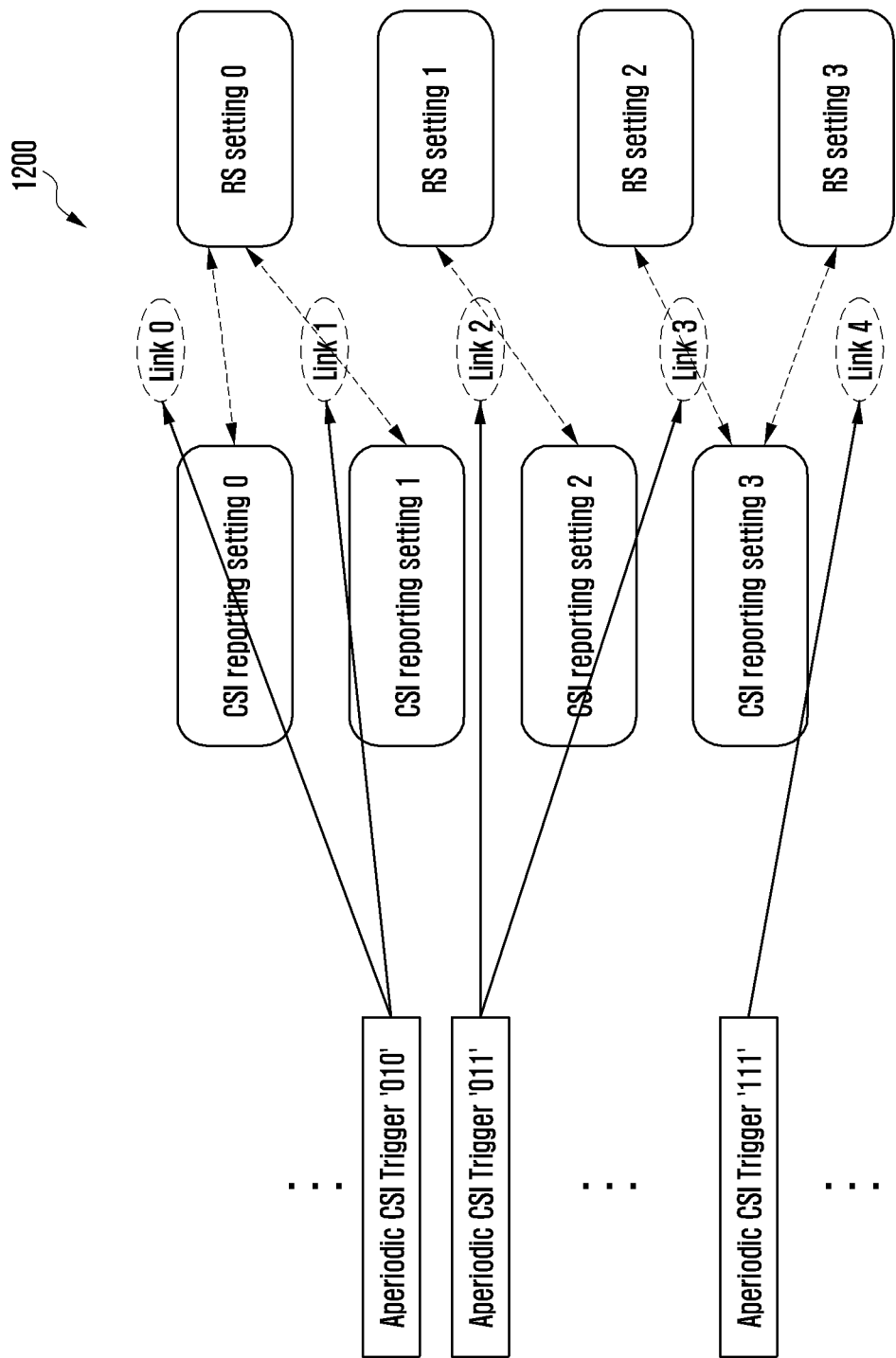
FIG. 12 illustrates a method of triggering a link in a trigger measurement setting using an aperiodic CSI reporting trigger method 1 according to an embodiment.

FIG. 12 illustrates a method of triggering a link in a trigger measurement setting based on an aperiodic CSI reporting trigger method 1 according to an embodiment.

Referring to FIG. 12, at 1200, an eNB may set a link triggered for each trigger field to an RRC in advance for the aperiodic CSI reporting. At this time, the eNB can directly set a link ID in a trigger setting in order to set the triggered link. As another example, the eNB can set the triggered link using a bitmap instructing links of all cells set to a UE.

The instruction order of the bitmap may be aligned in ascending or descending order based on a cell ID and the link ID.

Figure 13:
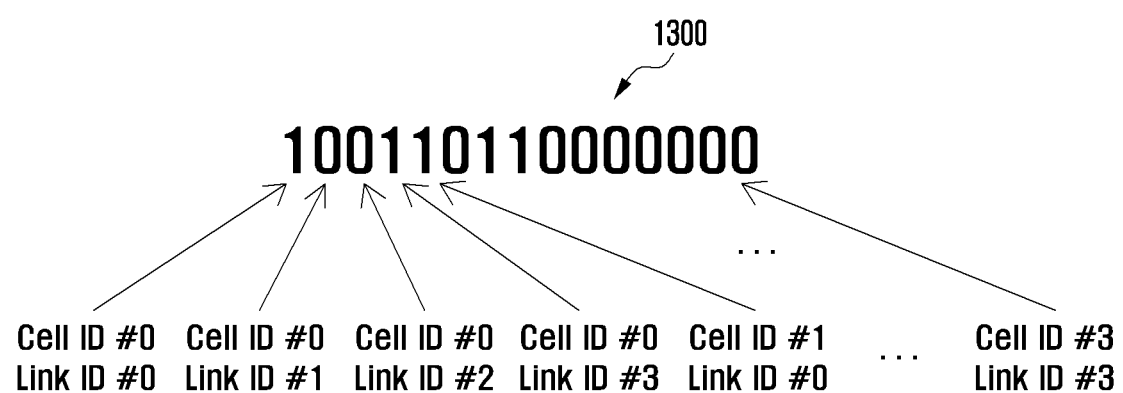
FIG. 13 illustrates an instruction order of a bitmap for an aperiodic CSI reporting trigger method 1 according to an embodiment.

FIG. 13 illustrates an instruction order of a bitmap for an aperiodic CSI reporting trigger method 1 according to an embodiment.

Referring to FIG. 13, the instruction order of a bitmap 1300 may be first aligned based on the cell ID, and then aligned in ascending order from an MSB to an LSB based on the link ID in the same cell ID. Although the instruction order is aligned based on the cell ID with higher priority in FIG. 13, alternatively, the instruction order may be aligned based on the link ID with higher priority or may be aligned in descending order.

The aperiodic CSI reporting trigger method 2 triggers a CSI reporting based on the CSI reporting setting in the CSI measurement setting.

Figure 14:
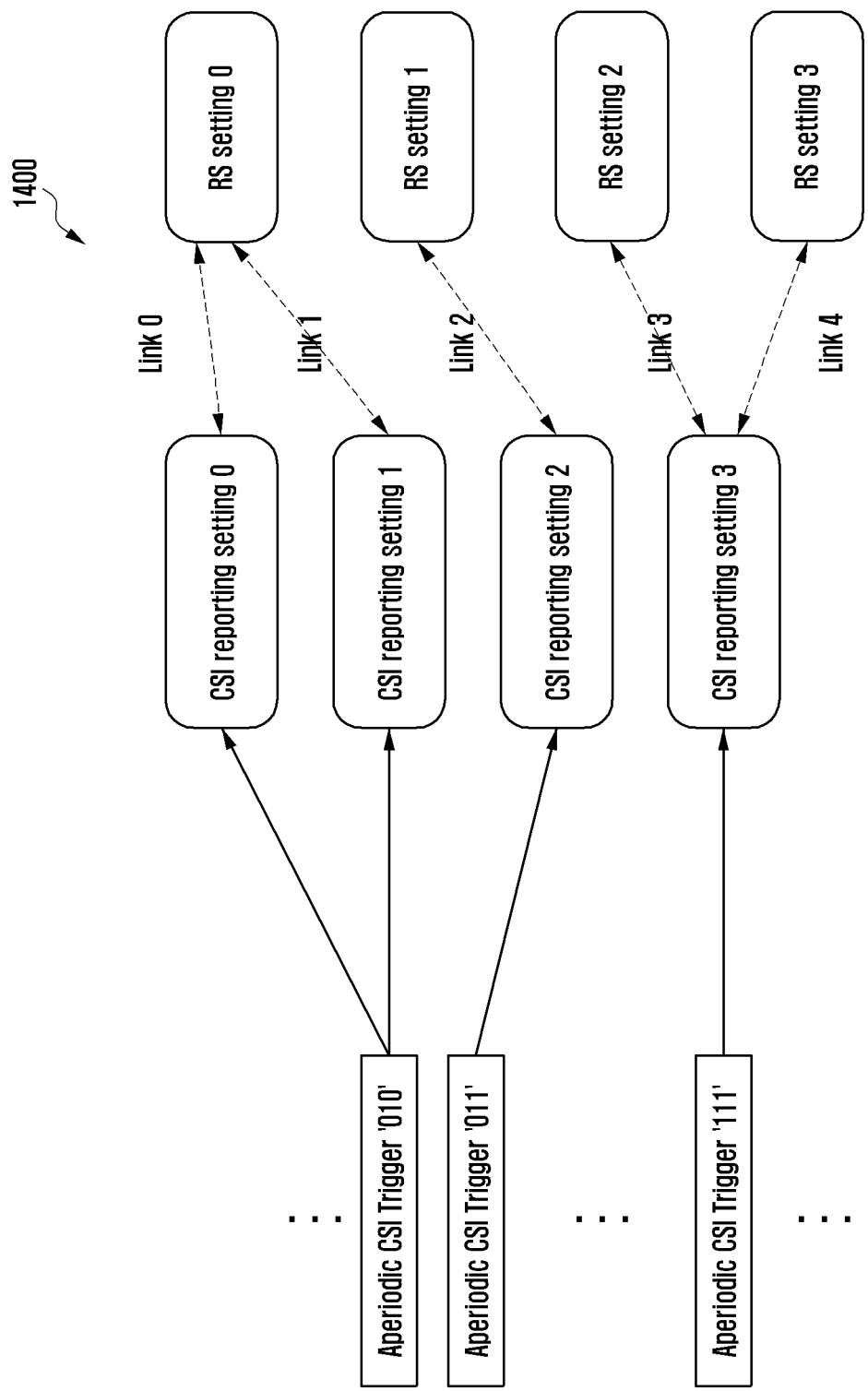
FIG. 14 illustrates a method of triggering CSI reporting setting in trigger measurement setting using an aperiodic CSI reporting trigger method 2 according to an embodiment.

FIG. 14 illustrates a method of triggering a CSI reporting setting in a CSI measurement setting according to an aperiodic CSI reporting trigger method 2 according to an embodiment.

Referring to FIG. 14, at 1400, the eNB may set the CSI reporting setting, which is triggered for each trigger field, to the RRC in advance for the aperiodic CSI reporting. The eNB may directly set a CSI reporting setting ID in the trigger setting to set the triggered CSI reporting setting. As another example, the eNB may set the CSI reporting setting triggered using a bitmap instructing CSI reporting settings of all cells set to a UE. The instruction order of the bitmap may be aligned in ascending or descending order based on the cell ID and the CSI reporting setting ID.

Figure 15:
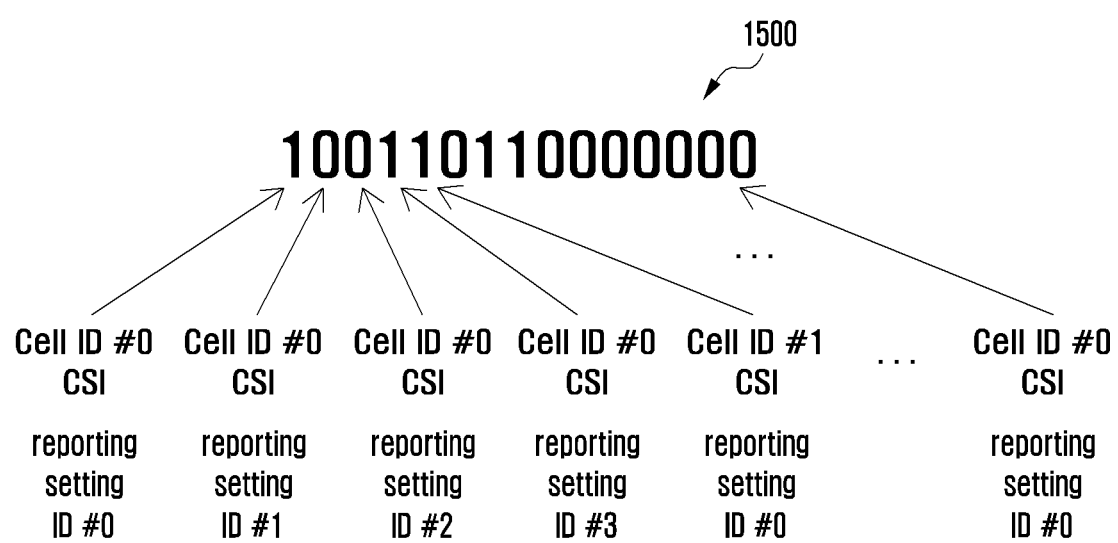
FIG. 15 illustrates an instruction order of a bitmap for an aperiodic CSI reporting trigger method 2 according to an embodiment.

FIG. 15 illustrates an instruction order of a bitmap for an aperiodic CSI reporting trigger method 2 according to an embodiment.

Referring to FIG. 15, the instruction order of a bitmap 1500 may be first aligned based on a cell ID, and then aligned in ascending order from an MSB to an LSB based on the CSI reporting ID in the same cell ID. Although the instruction order is aligned based on the cell ID with higher priority in FIG. 15, alternatively, the instruction order may be aligned based on the CSI reporting ID with higher priority or may be aligned in descending order.

As described above, in order for an eNB to trigger a CSI reporting based on a link, the eNB may report the aperiodic channel state to a UE through a DCI using trigger fields shown in Tables 17, 18, and 19 below.

TABLE 17

| Value of CSI request field | Description |
| --- | --- |
| '000' | No aperiodic CSI report is triggered |
| '001' | Aperiodic CSI report is triggered for a set of link(s) configured by higher layers for serving cell |
| '010' | Aperiodic CSI report is triggered for a $1^{st}$ set of link(s) configured by higher layers |
| ... | ... |

TABLE 18

| Value of CSI request field | Description |
| --- | --- |
| '000' | Aperiodic CSI report is triggered for a set of link(s) configured by higher layers for serving cell |
| '001' | Aperiodic CSI report is triggered for a $1^{st}$ set of link(s) configured by higher layers |
| '010' | Aperiodic CSI report is triggered for a $2^{nd}$ set of link(s) configured by higher layers |
| ... | ... |

Table 19

| Value of CSI request field | Description |
| --- | --- |
| '000' | Aperiodic CSI report is triggered for a $1^{st}$ set of link(s) configured by higher layers |
| '001' | Aperiodic CSI report is triggered for a $2^{nd}$ set of link(s) configured by higher layers |
| '010' | Aperiodic CSI report is triggered for a $3^{rd}$ set of link(s) configured by higher layers |
| ... | ... |

In Table 17, the eNB does not trigger the aperiodic CSI reporting to the UE using the instruction field, or may trigger all links of the corresponding cell. The eNB may trigger the links triggered for the CSI reporting through RRC settings in advance, using bits '010' after '001', as described in the trigger method 1.

The trigger field used in Table 18 excludes cases where CSI reporting is not triggered. Therefore, there may exist an option in which the CSI reporting is not triggered in preliminary setting of the trigger field in which setting such as '001' is possible.

According to Table 19, it is possible to provide flexibility to setting of the eNB by increasing the degree of freedom by excluding the aperiodic CSI reporting setting that reports all links of one used cell. Therefore, there may exist an option in which the CSI reporting is not triggered in preliminary setting of the trigger field in which setting such as '000' is possible, as in the above-mentioned Table 18.

As described above, in order for the eNB to trigger the CSI reporting based on the CSI reporting setting, the eNB may report the aperiodic channel state to the UE through a DCI using trigger fields as shown in Tables 20, 21, and 22 below.

TABLE 20

| Value of CSI request field | Description |
| --- | --- |
| '000' | No aperiodic CSI report is triggered |
| '001' | Aperiodic CSI report is triggered for a set of CSI reporting setting(s) configured by higher layers for serving cell |
| '010' | Aperiodic CSI report is triggered for a $1^{st}$ set of CSI reporting setting(s) configured by higher layers |
| ... | ... |

TABLE 21

| Value of CSI request field | Description |
| --- | --- |
| '000' | Aperiodic CSI report is triggered for a set of CSI reporting setting(s) configured by higher layers for serving cell |
| '001' | Aperiodic CSI report is triggered for a $1^{st}$ set of CSI reporting setting(s) configured by higher layers |
| '010' | Aperiodic CSI report is triggered for a $2^{nd}$ set of CSI reporting setting(s) configured by higher layers |
| ... | ... |

TABLE 22

| Value of CSI request field | Description |
| --- | --- |
| '000' | Aperiodic CSI report is triggered for a $1^{st}$ set of CSI reporting setting(s) configured by higher layers |
| '001' | Aperiodic CSI report is triggered for a $2^{nd}$ set of CSI reporting setting(s) configured by higher layers |
| '010' | Aperiodic CSI report is triggered for a $3^{rd}$ set of CSI reporting setting(s) configured by higher layers |
| ... | ... |

In Table 20, the eNB does not trigger the aperiodic CSI reporting to the UE using the instruction field, or may trigger all CSI reporting settings of the corresponding cell. The eNB may trigger the CSI reporting settings, which are triggered for the CSI reporting through RRC settings in advance, using bits '010' after '001' as described in the trigger method 2. The trigger field used in Table 21 excludes a case in which the CSI reporting is not triggered, and in this case, there may exist an option in which the CSI reporting is not triggered in preliminary setting of the trigger field in which setting such as '001' is possible.

According to Table 22, it is possible to provide flexibility to setting of the eNB by increasing the degree of freedom by excluding the aperiodic CSI reporting setting that reports all CSI reporting settings of one used cell. Even at this time, there may exist an option in which the CSI reporting is not triggered in preliminary setting of the trigger field in which setting such as '000' is possible, as in the above-mentioned Table 21.

The instruction field may be used to indirectly instruct an aperiodic CSI-RS for channel measurement and interference measurement.

Figure 16:
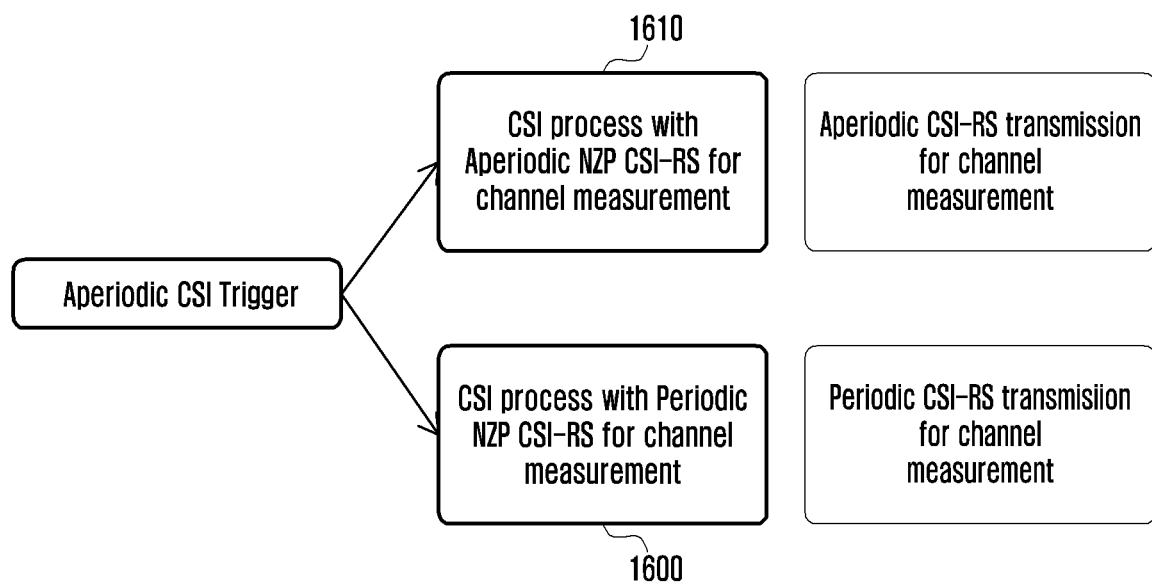
FIG. 16 illustrates an aperiodic CSI-RS being indirectly instructed using an aperiodic CSI reporting instruction field according to an embodiment.

FIG. 16 illustrates an aperiodic CSI-RS being indirectly instructed using an aperiodic CSI reporting instruction field according to an embodiment.

Referring to FIG. 16, an eNB triggers a CSI reporting using a link. If a resource supported for channel measurement is a periodic CSI-RS in a resource setting connected to the link at 1600, the aperiodic CSI reporting may be performed based on a channel measured in the existing periodic CSI-RS resource, and if the resource supported for channel measurement is an aperiodic CSI-RS in the resource setting connected to the link at 1610, the aperiodic CSI reporting may be performed based on a channel measured in a CSI-RS resource which is aperiodically set. The aperiodic CSI reporting trigger and the aperiodic CSI-RS may be transmitted in the same slot or subframe. In addition, as the CSI reporting and the aperiodic CSI-RS can be triggered through the CSI reporting setting instead of a link.

To support the CSI reporting, resources for a desired signal and interference measurement can be set to a UE through the resource setting shown in FIG. 11. The RRC parameters shown in Table 23 below can be considered for the resource setting.

TABLE 23

| Parameter name | Description | Value range |
| --- | --- | --- |
| CSI-RS-ResourceConfig | CSI-RS resource configuration | |
| CSI-RS-ResourceConfig Id | CSI-RS resource configuration ID | 0 .. CSI-RS-ResourceMax-1 |
| ResourceConfigType | Time domain behavior of resource configuration | aperiodic, semi-persistent, or periodic |
| CSI-RS-timeConfig | Contains periodicity and slot offset for periodic/semi-persistent CSI-RS | |
| Nrof Ports | Number of ports | 1, 2, 4, 8, 12, 16, [24], 32 |
| CSI-RS-ResourceMapping | Include parameters to capture OFDM symbol and subcarrier occupancy of the CSI-RS resource within a slot | |
| CDMType | Includes parameters to capture CDM value (1,2, 4, or 8), CDM pattern (frequency only, time and frequency, time only) | |
| CSI-RS-Density | Density of CSI-RS resource measured in RE/port/PRB | e.g., 1/2, 1, >1 |
| CSI-RS-FreqBand | Includes parameters to enable configuration of wideband and partial band CSI-RS | |
| Pc | Power offset of NZP CSI-RS RE to PDSCH RE | |
| ScramblingID | Scrambling ID | |

Based on a resource setting, an NR can support beam measurement, reporting, and management. An NR MIMO supports a large number of antennas, e.g., 1024, and a high frequency band, such as 30 GHz.

Millimeter-wave wireless communication exhibits a high linearity and a high path loss due to the characteristics of the corresponding band. To overcome this problem, a hybrid beamforming combining RF- and antenna-based analog beamforming and digital precoding-based digital beamforming is needed.

Figure 17:
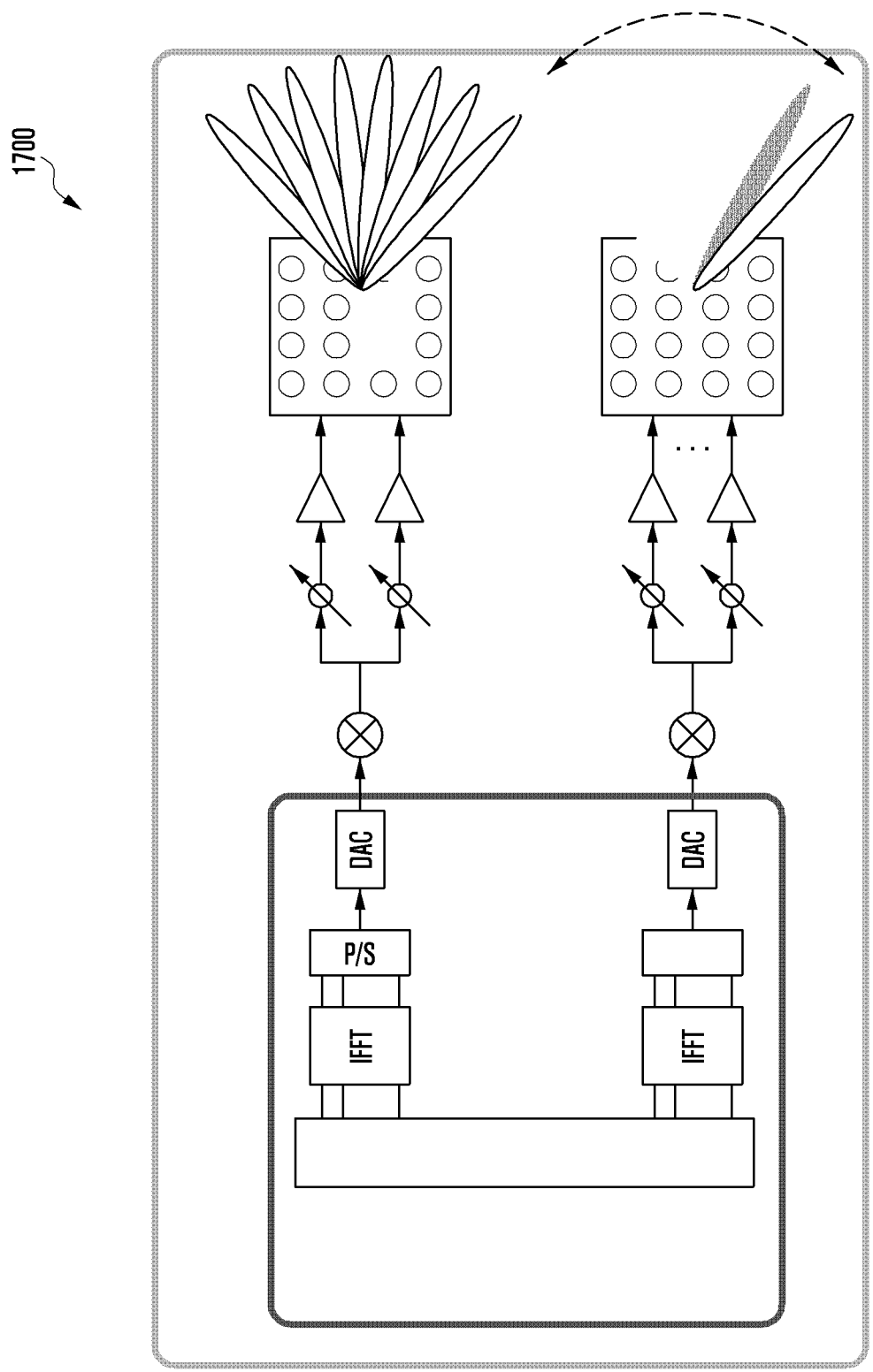
FIG. 17 illustrates hybrid beam forming according to an embodiment.

FIG. 17 illustrates a hybrid beamforming system 1700 according to an embodiment.

Referring to FIG. 17, an eNB and a UE include an RF chain and a phase shifter for digital beamforming and analog beamforming. An analog beamforming method on a transmission side changes phases of signals transmitted from each antenna through a phase shifter using a plurality of antennas to concentrate the signals in a specific direction. An array antenna, which is a collection of a plurality of antenna elements, may be used.

When using such transmission beamforming, the propagation distance of the signal can be increased, and because signals are rarely transmitted in directions other than the specific direction, interference to other users can be greatly reduced. Likewise, reception beamforming may be performed using a reception array antenna on a reception side, which also concentrates the reception of radio waves in a specific direction to increase sensitivity of the received signals coming in the specific direction, and excludes signals coming from directions other than the specific direction from the received signals to block interference signals.

As the transmission frequency becomes higher, the wavelength of the radio waves becomes shorter. For example, when an antenna is configured at half-wave intervals, the array antenna can be configured with a larger number of element antennas within the same area. Therefore, a communication system operating in a high frequency band can obtain a relatively higher antenna gain compared to using the beamforming technique in a low frequency band, so that it is advantageous to apply the beamforming technique to the communication system.

To obtain a higher antenna gain in the beamforming technique, a hybrid beamforming combining digital precoding, which is used to obtain high data transmission rate effect in the conventional multi-antenna system in addition to the application of the analog beamforming technique, is used. In this case, when one or more analog beams are formed through analog beamforming, a signal is transmitted by applying digital precoding similar to that applied in the conventional multi-antenna in a baseband, thereby receiving a more reliable signal or expecting higher system capacity. In accordance with an embodiment of the present disclosure, a method is provided for measuring beam quality according to a beam switching capability of the eNB and the UE, and reporting and using the corresponding information.

In applying the beamforming, a beam direction should be selected, which is optimized for the eNB and the UE. In order to select the optimized beam direction, the eNB and the UE may support beam sweeping using a plurality of time and frequency resources.

Figure 18:
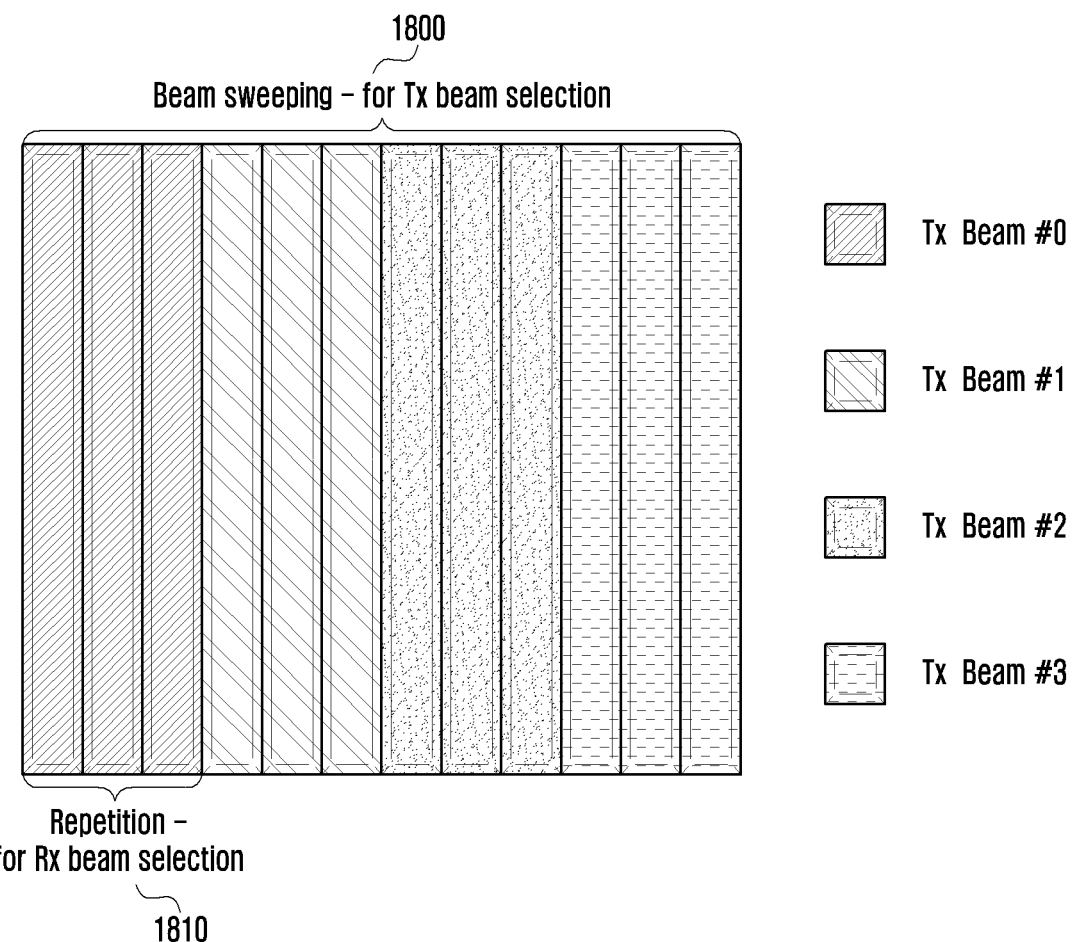
FIG. 18 illustrates a beam sweeping operation of a terminal and a base station in time resources according to an embodiment.

FIG. 18 illustrates a beam sweeping operation of a UE and an eNB in a time resource according to an embodiment.

Referring to FIG. 18, a UE or an eNB transmits a reference signal to the time resource using another beam for the purpose of beam selection of the UE or the eNB. The eNB or the UE having received the reference signal may measure the quality of the reference signal based on CSI, RSRP, reference signals received quality (RSRQ), etc., of the reference signal, and may select one or a plurality of transmission or reception beams according to the corresponding result. Although FIG. 18 illustrates the transmission of the reference signal based on the other beam through another time resource, it may be equally applied to frequency, cyclic shift, code resources, etc.

As illustrated in FIG. 18, a plurality of transmission beams may be transmitted for transmission beam sweeping at 1800, or one transmission beam may be repeatedly applied and transmitted for the purpose of reception beam sweeping at 1810.

A beam management operation, such as the beam sweeping, may also be performed based on the CSI reporting framework (the resource setting, the CSI reporting setting, the CSI measurement setting, the link, etc.) as described above with reference to FIGS. 11 to 16, and the periodic, semi-persistent, or aperiodic CSI-RS transmission and the CSI reporting/beam reporting.

In supporting the CSI reporting or the beam reporting, the NR may set a plurality of CSI-RS resources in a CSI-RS resource set for transmission of a plurality of beams for transmission beam sweeping and repetitive transmission of one transmission beam for reception beam sweeping in the resource setting, and may set information as to whether the CSI-RS resources are individual CSI-RS resources or the same CSI-RS resource is repeated. For example, RRC setting parameters as shown in Table 24 below may be provided.

TABLE 24

| Parameter name | Description | Value range |
| --- | --- | --- |
| ResourceSetConfigList | Contains up to ResourceSetMax resource set configurations (ResourceSetConfig) | |
| ResourceSetConfig | Resource set configuration | |
| ResourceSetConfigId | Resource set configuration ID | 0 .. ResourceSetMax-1 |
| CSI-RS-ResourceConfigList | ContainsuptoCSI-RS-ResourcePerSetMax CSI-RS resource configurations (CSI-RS-ResourceConfig) | |
| CSI-RS ResourceRepetitionConfig | Configuration of CSI-RS resource repetition ON/OFF | |

In Table 24, ResourceSetConfigList is a setting that allows a plurality of CSI-RS resource sets to be set. The plurality of CSI-RS resource sets can be set in the setting, and the individual CSI-RS resource sets can be set through the ResourceSetConfig.

In the ResourceSetConfig, settings of ResourceSetConfigId, CSI-RS-ResourceConfigList, and CSI-RS ResourceRepetitionConfig may exist. ResourceSetConfigId may set an ID for the setting of the CSI-RS resource set, and CSI-RS-ResourceConfigList can indicate CSI-RS resources configured in the CSI-RS resource set by setting IDs of the CSI-RS resources configured in corresponding CSI-RS resource set based on the IDs of the CSI-RS resources described in Table 23.

CSI-RS ResourceRepetitionConfig may set information as to whether the CSI-RS resources set in the CSI-RS resource set are transmitted based on beams having different individual CSI-RS resources for the purpose of transmission beam sweeping or whether the CSI-RS resources set in the CSI-RS resource set support repetition of the CSI-RS resource having the same individual CSI-RS resources. CSI-RS ResourceRepetitionConfig may be expressed as BeamRepetitionConfig or the like to instruct whether the corresponding CSI-RS resource set supports the same beam.

In setting the repetition of the CSI-RS resource in the setting of the CSI-RS resource set, a 1 or 2 port CSI-RS resource may be set as each CSI-RS resource.

In performing the transmission beam sweeping and the reception beam sweeping described above with reference to FIG. 18, the number of the transmission beams may be 1024, for example, as described above, and may be increased when considering the reception beam sweeping. Therefore, by limiting the number of the corresponding antenna ports to 1 or 2 as a maximum in order to set the CSI-RS resource for the sweeping, it is possible to reduce the overhead for transmission of the reference signal and to support beam management to be performed efficiently.

For the Type I and Type II CSI reportings and the beam management information reporting of the UE described above, the UE may report a physical UL shared channel (PUSCH) and a PUCCH using the channel state and the beam management information. The NR can support two transmission types of PUCCHs, such as a PUCCH having a short period (i.e., a short duration PUCCH or short PUCCH) and a PUCCH having a long period (i.e., a long duration PUCCH or long PUCCH).

Figure 19:
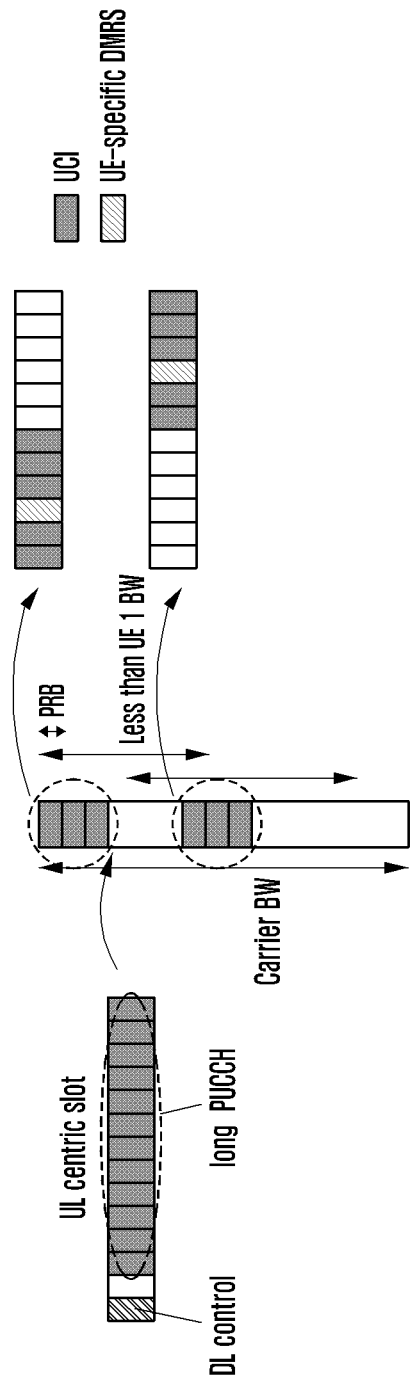
FIG. 19 illustrates transmission of a long physical uplink control channel (PUCCH) with a long period according to an embodiment.

FIG. 19 illustrates transmission of a long PUCCH with a long period according to an embodiment.

Referring to FIG. 19, the long PUCCH may be transmitted through a minimum of three OFDM symbols to a maximum of 14 OFDM symbols within one slot, or may be transmitted through aggregation of a plurality of slots. The long PUCCH may transmit a large amount of information at a time. In order to transmit a large amount of information, the PUCCH can be transmitted through up to 14 OFDM symbols within the slot, thereby securing a large number of resources in the time axis. In addition, the PUCCH can be transmitted through aggregation of additional slots.

As illustrated in FIG. 19, the PUCCH may be transmitted using more PRBs on the frequency axis, thereby adding more frequency resources. Through this relatively large amount of time and frequency resources, the long PUCCH may allow a UE to transmit a larger amount of information to an eNB at one time.

The long PUCCH may also allow the UE to acquire coverage for UL control information (UCI) transmission. Compared to the eNB, the UE transmits a signal with relatively low power due to an implementation space, a battery, etc.

Also, unlike a DL, which is planned through cell planning in advance, in an UL, interference of the UE may be dynamically changed according to the distribution and use of a user, and in the worst case, the UE may experience high interference while transmitting an UL signal, due to other UEs located nearby. Therefore, a UE often experiences a low SINR.

Energy per bit of the signal transmitted by the UE is lowered through additional allocation of the frequency resource. Accordingly, in order to secure the coverage of the signal transmitted by the UE, the same information is transmitted to various time resources, so that the total transmission power of the signal may be increased, while the energy per bit is maintained. Therefore, the same signal is repeatedly transmitted to a plurality of allocated time resources, thereby supporting the UE to secure the coverage of the signal. In addition, the UL transmission efficiency of the UE may be increased by supporting DFT-S OFDM waveforms exhibiting low peak-to-average power ratio (PAPR) characteristics.

Compared to the long PUCCH, the short PUCCH enables efficient transmission of a small amount of information using a small number of resources. For this purpose, a UCI may be transmitted on a small number of OFDM symbols (e.g., one or two OFDM symbols), and the short PUCCH is based on the CP-OFDM waveform for efficient data transmission. The short PUCCH transmission may be efficient using CP-OFDM and the small number of OFDM symbols, but UEs having relatively excellent UL channel state may transmit the UCI using the short PUCCH.

If the quality of the UL channel is not sufficiently good because the UE is located in a cell boundary or a UE simultaneously supporting UL transmission is located nearby, transmission using the short PUCCH may not be supported.

Based on the short PUCCH and the long PUCCH, the NR supports PUCCH formats as shown in Table 25 below.

TABLE 25

|  | Format 0 | Format 1 | Format 2 | Format 3 | Format 4 |
|---|---|---|---|---|---|
| Waveform | CP-OFDM | DFT-S-OFDM | CP-OFDM | DFT-S-OFDM | DFT-S-OFDM (Pre-DFT) |
| # of symbols | Up to 2 | 4-14 | Up to 2 (Short PUCCH) | 4-14 (Long PUCCH) | 4-14 (Long PUCCH with Pre-DFT OCC) |
| # of PRBs | 1 | 1 | Configurable | | 1 |
| # of UCI bits | ≤2 | ≤2 | 1~For further study (FFS) | 1~FFS | 1~FFS |
| UCI type | 1-bit/2-bit HARQ-ACK and/or SR | | HARQ-ACK with/without SR + CSI feedback | | |
| Encoding | Seq. selection | Seq. modulation | RM for UCI bits ≤ 11, Polar for UCI bits > 11 | | |

TABLE 25-continued

|  | Format 0 | Format 1 | Format 2 | Format 3 | Format 4 |
|---|---|---|---|---|---|
| Modulation | — | Binary Phase Shift Keying (BPSK)/QPSK | | QPSK | |
| DMRS ratio | — | ~1/2 | 1/3 | | Variable |
| Freq. hopping | | Enable/disable by UE-specific RRC signaling | | | |
| Location in time domain | Symbol index 0-13 | Symbol index 0-10 | Symbol index 0-13 | Symbol index 0-10 | Symbol index 0-10 |
| Location in freq. domain | | Within a UE's Bandwidth Part (BWP) | | | |

PUCCH formats 2, 3, and 4 among the PUCCH formats can be used for the CSI reporting. The PUCCH format 2, based on the short PUCCH, may support the periodic or semi-persistent CSI reporting only using Type I CSI.

In addition, the PUCCH format 2 may support only wideband or partial band channel state information reporting that reports only one PMI and CQI, so that the eNB may easily monitor the channel state based on a small amount of information.

PUCCH formats 3 and 4, based on the long PUCCH, are the same as the format 2 in that they support only the periodic or semi-persistent CSI reporting, but are different from the PUCCH format 2 in that they support type II CSI and subband reporting that reports PMI and CQI for each subband. In addition, the format 4 differs from the format 3 in that an orthogonal cover code (OCC) is used to support inter-UE multiplexing.

When PUSCH and PUCCH-based reportings do not allow a plurality of CSI reportings of the UE or an amount of information that can be transmitted based on the PUCCH and the PUSCH is insufficient, the remaining CSI reportings, except for one CSI reporting, or some of the CSI reportings, should be dropped.

Figure 20:
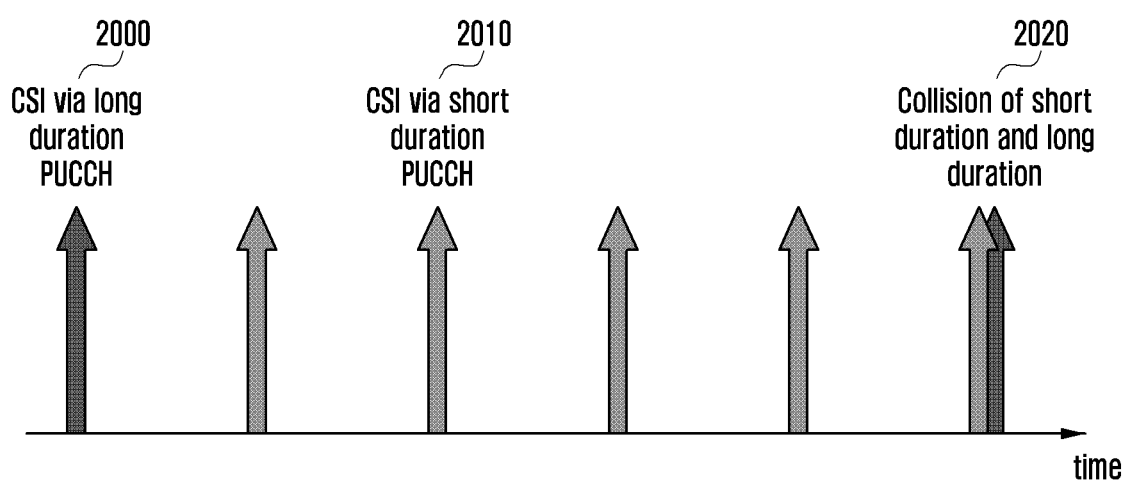
FIG. 20 illustrates a short PUCCH (format 2) and a long PUCCH (format 4) colliding with each other according to an embodiment.

FIG. 20 illustrates a short duration PUCCH (format 2) and a long duration PUCCH (format 4) colliding with each other according to an embodiment.

Referring to FIG. 20, a short duration PUCCH 2010 and a long duration PUCCH 2000 may collide with each other as in 2020. In the collision of these different transmission type-based reportings (collision of PUCCH and PUSCH-based reportings) and the collision of the same transmission type-based reporting (collision of PUCCH and PUCCH or collision of PUSCH and PUSCH), in order for the UE to drop the remaining CSI reportings, except for one CSI reporting and/or beam management information (hereinafter, may be mixed with the CSI reporting) or some of all the CSI reportings, the following priority can be considered.

Priority determination method 1: priority of CSI reporting and/or beam management information is determined based on time transmission type of CSI reporting.

Priority determination method 2: priority of CSI reporting and/or beam management information is determined based on the transmission channel and channel format (e.g., PUCCH or PUSCH) of the CSI reporting.

Priority determination method 3: priority of CSI reporting and/or beam management information is determined according to the types of the CSI reporting and/or the beam management information.

Priority determination method 4: priority of CSI reporting and/or beam management information is determined according to the codebook type.

Priority determination method 5: priority of CSI reporting and/or beam management information is determined according to the number of PMI reportings.

Priority determination method 6: priority of CSI reporting and/or beam management information is determined based on a CSI reporting setting ID or a CSI-RS ID.

The priority determination method 1 is a method of determining the priority of the CSI reporting and/or the beam management information based on the time transmission type. Table 26 shows a field for setting the time transmission type of the channel state information through an RRC when the eNB sets the CSI reporting to the UE.

TABLE 26

| reportConfigType | ReportConfigType New | ReportConfigType | Time domain behavior of reporting configuration | aperiodic, semi-persistent-pucch, semi-persistent-pusch, or periodic |
|---|---|---|---|---|

As shown in Table 26, the UE may receive setting of the time transmission type of the CSI reporting from the eNB through the CSI reporting setting in the RRC field or an RRC field below provided in CSIReportConfig. This setting may be aperiodic transmission, semi-persistent transmission using a PUCCH, semi-persistent transmission using a PUSCH, periodic transmission, etc. When the CSI reporting and/or the beam management information collide, the priority can be determined according to the transmission type.

For example, when the aperiodic transmission and the periodic transmission or the semi-persistent transmission collide with each other, the aperiodic transmissions may be prioritized. By triggering detailed channel state information reporting according to a need of the eNB, the aperiodic transmission includes a larger amount of information (e.g., Type II CSI, subband reporting information, etc.) than the channel state information set through the existing RRC or MAC CE. Accordingly, at the time of collision, the UE may preferentially report the aperiodic channel state information. Likewise, at the time of collision between the semi-persistent transmission and the periodic transmission, the UE may preferentially perform the semi-persistent transmission. The semi-persistent transmission may include a relatively large amount of information (e.g., subband reporting information), and thereby may preferentially perform the semi-persistent transmission capable of being freely activated and deactivated, thereby effectively operating the communication system.

The priority determination method 2 determines priority according to which transmission channel and format (PUSCH or PUCCH, and PUCCH format) is used to transmit the channel state information or the beam management information. Table 27 shows a PUCCH format and a resource setting for the eNB to set the CSI reporting to the UE.

TABLE 27

| pucch-CSI-Resourceindex | PUCCH-CSI-Resource | New | PUCCH-CSI-Resource | Indicates which PUCCH resource to use for periodic/semi-persistent reporting on PUCCH Optional parameter for semi-persistent reportConfigType. If this field is not present, the CSI Report Setting is for PUSCH-based SP reporting | CHOICE{PUCCH-resource-config-PF2, PUCCH-resource-config-PF3, PUCCH-resource-config-PF4} |
| --- | --- | --- | --- | --- | --- |

As described above, the PUCCH format 2 based on the short PUCCH supports low coverage and a small amount of information, but may quickly transmit information through a small amount of time and frequency resources. However, the long PUCCH-based PUCCH formats 3 and 4 can support high coverage through repetitive transmission, and can support subband or Type II channel state information reporting requiring a large amount of information through a large amount of resources. Accordingly, when the format 2 and the format 3 or the format 4 collide with each other, the channel state information reporting based on the format 3 or the format 4, which require a larger amount of information and resources, may be prioritized, and the eNB may obtain the PUCCH reporting based on the larger amount of information and the higher coverage. In addition, even when the PUSCH and the PUCCH collide with each other similarly, the PUSCH-based transmission supporting a larger amount of information may be prioritized.

When the PUCCH formats 3 and 4 collide with each other, the PUCCH format 3 may be prioritized.

For the PUCCH format 4, information of a plurality of UEs is multiplexed through an OCC to be transmitted, so that the reporting performance of the corresponding PUCCH may not be high. Therefore, the PUCCH format 3, which is capable of ensuring better coverage, may be preferentially transmitted, and the eNB can securely acquire the channel state information.

On the contrary, the PUCCH format 4 may be prioritized. In the PUCCH format 4, because the eNB can efficiently use the resources according to the multiplexing of the UE, efficient information transmission can be supported with a smaller amount of resources than when using the PUCCH format 3. Therefore, the PUCCH format 4 may be preferentially transmitted, and the eNB can efficiently use radio resources.

For priorities between the PUCCH formats 3 and 4, the eNB may set which of the formats has a higher priority through an RRC setting. As described above, because each format transmission has an advantage, the eNB may flexibly set and use the format transmission according to the situation of the system.

The priority determination method 3 determines the priority according to the type of the corresponding channel state information. Table 28 below shows a field in which an eNB sets the CSI reporting to a UE or sets information used for the corresponding CSI reporting through an RRC in CSIReportConfig.

TABLE 28

| reportQuantity | ReportQuantity | New | ReportQuantity | The CSI reiated quantities to report | {No Report, CRI/RI/PMI/CQI, CRI/RI/i1, CRI/RI/i1/CQI, CRI/RI/CQI, CRI/RSRP, SSB index/RSRP, CRI/RI/LI/PMI/CQI) |
| --- | --- | --- | --- | --- | --- |

As described above, the eNB may set reporting based on CRI/RI/PMI/CQI, reporting based on CRI/RI/i1, reporting based on CRI/RI/i1/CQI, reporting based on CRI/RI/CQI, reporting based on CRI/RSRP, reporting based on a synchronization signal block (SSB) index/RSRP, reporting based on CRI/RI/LI/PMI/CQI, etc., according to information setting fields. According to this setting, the UE may set a priority to perform reporting, and the CSI reporting and the beam management information reporting can be efficiently performed.

For example, the reportings are divided into a CQI-based reporting group (CRI/RI/PMI/CQI, CRI/RI/i1, CRI/RI/i1/CQI, CRI/RI/CQI, CRI/RI/LI/PMI/CQI, etc.) and an RSRP-based reporting group (CRI/RSRP or SSB index/RSRP), and if there is a collision between the two groups, the CQI-based reporting may be prioritized because the CQI-based reporting contains a larger amount of information, such as RI, PMI, and CQI, and requires more UE complexity for such calculations.

In contrast, the RSRP-based reporting may be prioritized because, if the beam-based reporting of the eNB is not correct, it is impossible to transmit proper control signals and data to the UE.

It is also possible to determine the priority between the CQI-based reporting group and the RSRP-based reporting group differently, according to the time transmission type of the priority determination method 1 described above. For example, for periodic and semi-persistent channel and beam management information reporting, information of the CQI-based reporting group that requires a larger amount of information and computation for channel monitoring may be more useful. In particular, since beam information changes relatively infrequently, it may be preferable that the information of the CQI-based reporting group be prioritized for the periodic and semi-persistent channel and beam management information reporting for channel monitoring. However, in the aperiodic channel state and beam management information reporting, in order for the eNB to urgently trigger beam information transmission based on determination that beam information for transmitting control information and data to the UE is inaccurate, the beam information may be more urgently required than the CQI information. Therefore, information of the RSRP-based reporting group may be preferentially transmitted rather than the CQI-based reporting group.

When reportings within the RSRP-based reporting group collide with each other, the CRI/RSRP reporting may be prioritized over the SSB index/RSRP reporting because the CSI-RS-based CRI reporting requires additional reference signal overhead through the CSI-RS and can generate more accurate channel state information over a wider bandwidth.

For information including i2 (CRI/RI/PMI/CQI) in the CQI-based reporting group and information not including i2 (CRI/RI/i1/CQI or CRI/RI/i1), the information including i2 may be prioritized. For the information not including i2, the eNB considers that the moving speed of the UE is fast, and obtains an average CQI value by circulating a precoder to perform reporting. Because this information does not change relatively frequently, the information including i2 may be preferentially transmitted.

In contrast, the information not including i2 may be prioritized. CRI/RI/i1 is to support a non-precoded (NP) CSI-RS or cell-specific beamforming (BF) CSI-RS-based operation based on many CSI-RS ports or resources and a hybrid CSI-based operation based on fewer CSI-RS port-based UE specific BF CSI-RS.

Figure 21:
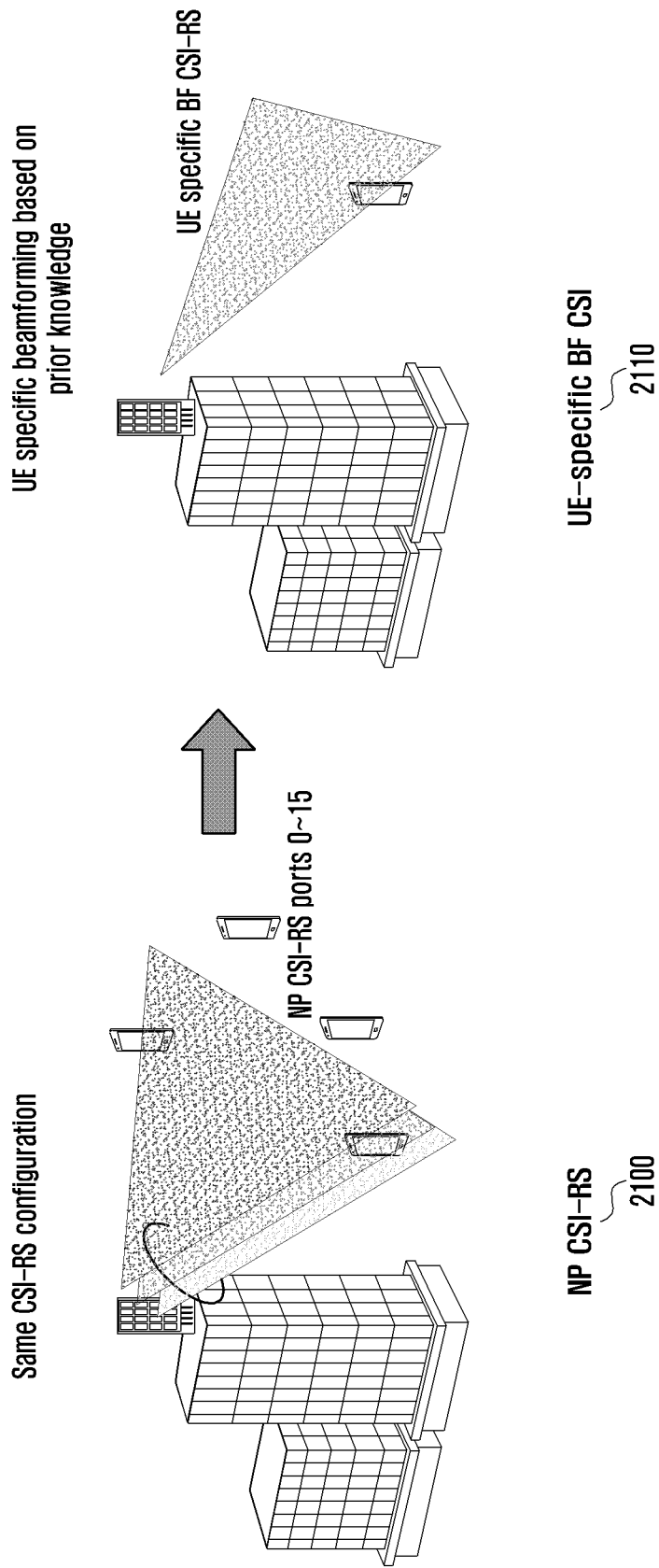
FIG. 21 illustrates a hybrid CSI-based operation in which a non-precoded (NP) CSI-RS and a user equipment (UE) specific beamformed (BF) CSI-RS are combined according to an embodiment.
Figure 22:
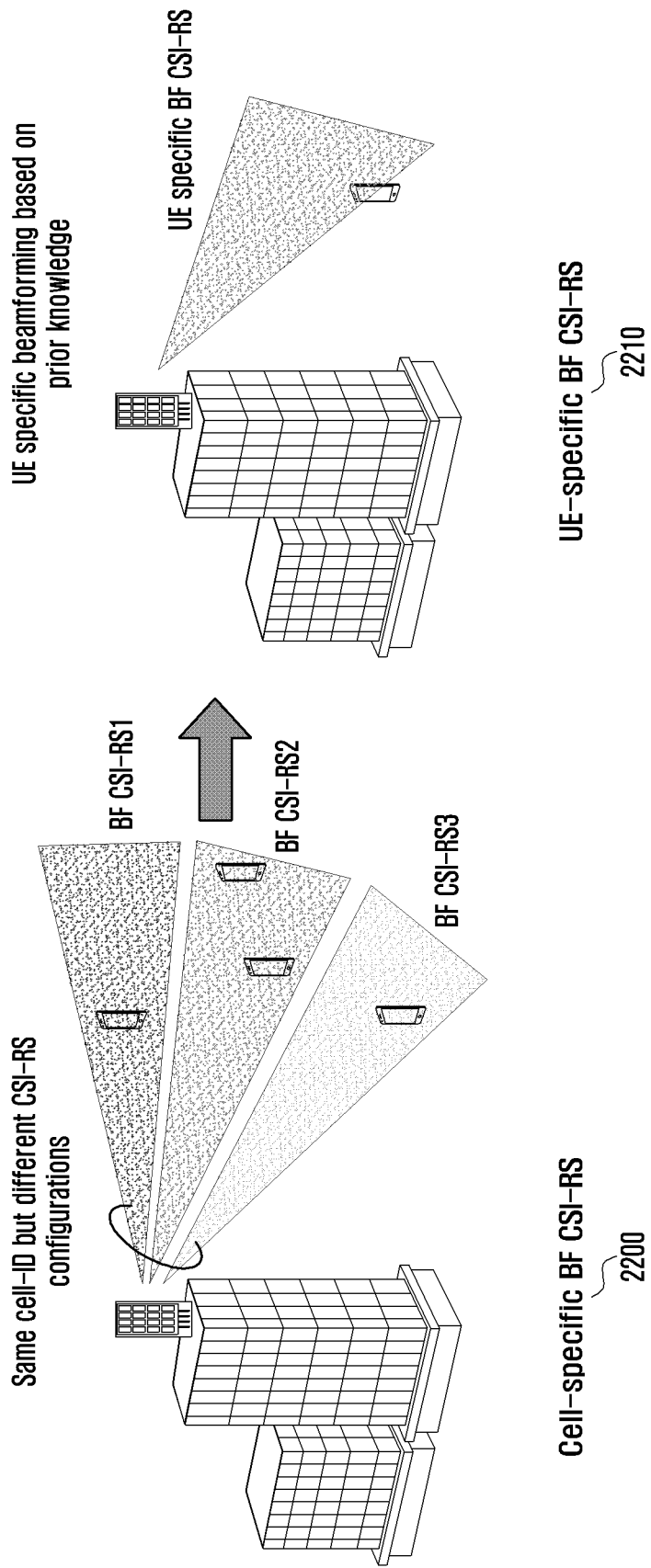
FIG. 22 illustrates a hybrid CSI-based operation in which a cell specific CSI-RS and a UE specific BF CSI-RS are combined according to an embodiment.

FIGS. 21 and 22 illustrate an example of such a hybrid CSI-based operation.

Specifically, FIG. 21 illustrates a hybrid CSI-based operation in which an NP CSI-RS and a UE specific BF CSI-RS are combined according to an embodiment, and FIG. 22 illustrates a hybrid CSI-based operation in which a cell specific CSI-RS and a UE specific BF CSI-RS are combined according to an embodiment.

Referring to FIGS. 21 and 22, the use of an NP CSI-RS 2100 requiring many CSI-RS ports (e.g., 32 ports) in FIG. 21 has an advantage in that a UE calculates precise information based on the many CSI-RS ports to report precoding information and CQI, but it requires a lot of reference signal overhead. The use of a cell-specific BF CSI-RS 2200 of FIG. 22 has an advantage in that a UE calculates precise information based on many CSI-RS resources (e.g., 64 resources) to report beam information and information, such as PMI and CQI corresponding to the beam information through a CSI-RS resource indicator (CRI), but it also requires a lot of reference signal overhead. In contrast, UE-specific BF CSI-RSs 2110 and 2210 of FIGS. 21 and 22 have an advantage in that a UE can report the channel state information based on fewer CSI-RS ports (e.g., 4 ports) and resources (e.g., 1 resource), but the eNB should acquire preliminary beam or channel information through the SRS, the NP CSI-RS, or the cell-specific BF CSI-RS so that the UE-specific BF CSI-RSs 2110 and 2210 may be operable.

Therefore, the preliminary beam or channel information is acquired through long period-based NP CSI-RS or cell-specific BF CSI-RS, and channel information is acquired in the corresponding beam through short period-based UE-specific BF CSI-RS, so that the reference signal overhead can be reduced and the channel state information can be obtained efficiently. CRI/RI/i1 may be used to allow a UE to transmit beam direction information for such a hybrid-based operation. Therefore, this problem of the reference signal overhead may be solved in such a manner that a lot of overhead-based information is prioritized over general CQI information.

In addition, the priority according to the presence or absence of i1 mentioned above can be applied differently between CRI/RI/i1/CQI and CRI/RI/i1. For example, CRI/RI/i1 has a higher priority than CRI/RI/PMI/CQI and CRI/RI/i1/CQI has a lower priority than CRI/RI/PMI/CQI.

Information (CRI/RI/PMI/CQI) including PMI may be prioritized over information (CRI/RI/CQI) not including PMI in the CQI-based reporting group because the information including PMI contains direction information, so that more information can be provided to the eNB.

In contrast, the information not including PMI may be prioritized because the information not including PMI is for a TDD-based operation and the channel state information is acquired in advance through the SRS, so that it is possible to provide information with higher accuracy than the PMI.

In addition, for reporting information (CRI/RI/LI/PMI/CQI) including a layer indicator (LI) and information (CRI/RI/PMI/CQI) not including the LI, because LI information for indicating a preferred layer is additionally transmitted for a phase-tracking reference signal (PTRS) transmission by a UE, information in which the LI is reported may be prioritized over information in which the LI is not reported.

The priority determination method 4 determines priority differently according to the codebook type. As described above, the NR supports two types of CSI reporting codebooks, i.e., Type I and Type II.

Table 29 below shows an RRC field for setting the Type I and Type II CSI reporting codebooks.

TABLE 29

| CodebookConfig | type1 | Type1-Parameters | New | Type1-Parameters | Parameters for Type I codebook |
|---|---|---|---|---|---|
| CodebookConfig | type2 | Type2-Parameters | New | Type2-Parameters | Parameters for Type II codebook |

The Type II CSI reporting is performed on the assumption of reporting in a unit of subband, and is performed with a relative amplitude and phase difference for aggregation for the purpose of aggregation between a main beam and a sub beam in the form of aggregation of multiple beams, rather than one beam. The relative amplitude and phase difference in the subband may be reported with the amplitude of wideband and a phase difference. The presence or absence of the subband phase difference can be set through RRC. In addition, up to four beams can be aggregated in the beam for aggregation, and the number of beams used for actual aggregation can also be set through the RRC.

In this manner, the Type II CSI reporting requires higher UE complexity than the Type I CSI reporting, and thus, contains more information. Therefore, by allowing the UE to prioritize the Type II CSI reporting, the eNB may acquire a larger amount of information. In addition, this reporting may be one of the reportings in the CQI-based reporting group described in the priority determination method 3 above.

The priority determination method 5 determines the priority according to CSI reporting setting or PMI type setting of CSIReportConfig.

Table 30 shows an RRC field for the PMI type setting.

TABLE 30

| pmi-Formatindicator | PMI-Formatindicator | New PMI-Formatindicator | Single or multiple PMIs | widebandPMI, subbandPMI |
|---|---|---|---|---|

As shown in Table 30, the eNB may give priorities to the UE according to whether the PMI reporting reports one PMI based on a wideband or a plurality of PMIs for each subband. The subband reporting reports the PMI for each subband, so that the subband reporting contains a large amount of information based on higher UE computational complexity. Accordingly, information reported for each subband may be prioritized, so that the eNB may acquire a larger amount of information. In addition, this reporting may be one of the reportings in the COI-based reporting group described in the priority determination method 3 above.

The priority determination method 6 determines the priority based on CSI-RS or cell ID associated with CSI reporting setting or ID of CSIReportConfig or ID of the CSI reporting setting. An eNB may assign a lower number ID to a UE for a more important cell (e.g., a primary cell) and assign a higher number ID for a less important cell (e.g., a secondary cell). Therefore, a reporting having a low CSI-RS or a low cell ID associated with CSI reporting setting or CSIReportConfig having a low ID or the CSI reporting setting having a low ID may be prioritized, so that a collision situation of the CSI reporting can be solved.

In addition, the priority determination methods 1 and 3 may be combined and used as shown in Equation (2) below.

Aperiodic RSRP reporting>aperiodic Type II reporting>aperiodic Type I reporting>semi-persistent Type II reporting>semi-persistent Type I reporting>semi-persistent RSRP reporting>periodic Type I reporting>periodic RSRP reporting    (2)

As described above, the aperiodic RSRP-based information is used to allow the eNB to obtain important beam-related information. For semi-persistent and periodic reporting, CQI-based reporting may be prioritized over RSRP. The priority differentiation of the RSRP-based information may be applied differently depending on whether a PUCCH or a PUSCH is used in the semi-persistent CSI reporting.

Using Equation (3) below, the priority may be applied differently within the semi-persistent reporting.

Aperiodic RSRP reporting>aperiodic Type II reporting>aperiodic Type I reporting>PUSCH-based semi-persistent RSRP reporting>PUSCH-based semi-persistent Type II reporting>PUSCH-based semi-persistent Type I reporting>PUCCH-based semi-persistent Type II reporting>semi-permanent Type I reporting>PUCCH-based semi-permanent RSRP reporting>periodic Type I reporting>periodic RSRP reporting    (3)

The semi-persistent CSI reporting is differently activated and deactivated depending on whether the corresponding CSI reporting uses a PUCCH or a PUSCH. The semi-persistent CSI reporting is activated and deactivated by utilizing semi-persistent scheduling (SPS) using a DCI when the PUSCH is used. However, when the PUCCH is used, the semi-persistent CSI reporting is activated by utilizing a MAC CE. Accordingly, the PUSCH-based semi-persistent reporting may be triggered faster using the DCI, and RSRP reporting based on this may be requested quickly from the eNB in the same manner as in the aperiodic RSRP reporting.

Therefore, the PUSCH-based semi-persistent reporting may be used to obtain important beam information in the same manner as in the aperiodic RSRP reporting. However, the PUCCH-based semi-persistent RSRP reporting is activated and deactivated using the MAC CE, so that more latency for activation and deactivation is required. As a result, the PUCCH-based semi-persistent RSRP reporting is not as good to obtain important beam information. Therefore, for semi-persistent PUSCH reporting, the RSRP reporting may be prioritized, and for semi-persistent PUCCH reporting, the Type II information may be prioritized.

In addition, the priority may be applied differently within the semi-persistent reporting using Equation (4).

Aperiodic Type II reporting>aperiodic RSRP reporting>aperiodic Type I reporting>semi-permanent Type II reporting>semi-permanent Type I reporting>semi-permanent RSRP reporting>periodic Type I reporting>periodic RSRP reporting    (4)

Equation (4) may be used because the aperiodic Type II CSI includes a lot of information and should be prioritized over other information, so that the RSRP-based reporting and Type I reporting for the beam may be performed later. Because beam information is very important information and the aperiodic RSRP information is used to obtain urgent information, the aperiodic RSRP-based reporting may be prioritized over the Type I reporting. However, the Type II reporting requires high computational complexity and reporting overhead, and therefore, the Type II reporting may be prioritized over the RSRP-based reporting. Equation (4) may also be extended according to which channel the semi-persistent CSI reporting uses as shown in Equation (5).

Aperiodic Type II reporting>aperiodic RSRP reporting>aperiodic Type I reporting>PUSCH-based semi-persistent Type II reporting>PUSCH-based semi-persistent RSRP reporting>PUSCH-based semi-persistent Type I reporting>PUCCH-based semi-persistent Type II reporting>PUCCH-based semi-permanent Type I reporting>PUCCH-based semi-persistent RSRP reporting>periodic Type I reporting>periodic RSRP reporting    (5)

In addition, even in the aperiodic case, the priority is supported in the same manner as that in the semi-persistent and periodic cases, based on an amount of information, as shown in Equation (6) below.

Aperiodic Type II reporting>aperiodic Type I
reporting>aperiodic RSRP reporting>semi-per-
sistent Type II reporting>semi-persistent Type I
reporting>semi-persistent RSRP
reporting>periodic Type I reporting>periodic
RSRP reporting  (6)

In addition, in the same time transmission type, the Type II may be prioritized over the Type I, so that a larger amount of information can be acquired.

The priority may be further assigned based on Equations (2) through (6) above.

If reportings with the same priority (e.g., the periodic Type I reporting and the periodic Type I reporting) collide with each other, the priority of each reporting may be determined based on the PUCCH format of the priority determination method 2. For example, if a PUCCH format 2-based reporting including periodic Type I information and a PUCCH format 3-based reporting including periodic Type I information collide with each other, the PUCCH format 3-based reporting may be preferentially transmitted.

Based on Equations (2), (3), (4), (5), and (6), the priority of each reporting may be determined based on the PMI type of the priority determination method 5. For example, if a periodic Type I wideband PMI reporting collides with a periodic Type I subband PMI reporting, the UE may preferentially transmit the subband PMI reporting.

Based on Equations (2), (3), (4), (5), and (6), the priority determination methods 2 and 5 can be simultaneously applied. If the priority is the same after the determination method 2 is preferentially applied, the determination method 5 may be applied. If the priority is the same after the determination method 5 is preferentially applied, the determination method 2 may be applied.

If the priority is the same, even after the above method is applied, the priority may be additionally determined based on the ID as in the priority determination method 6.

Resources for interference measurement may be set for the above-described CSI reporting operation and the beam management operation. For example, interference measurement methods, such as those of FIGS. 23 and 24, can be used for such interference measurement.

Figure 23:
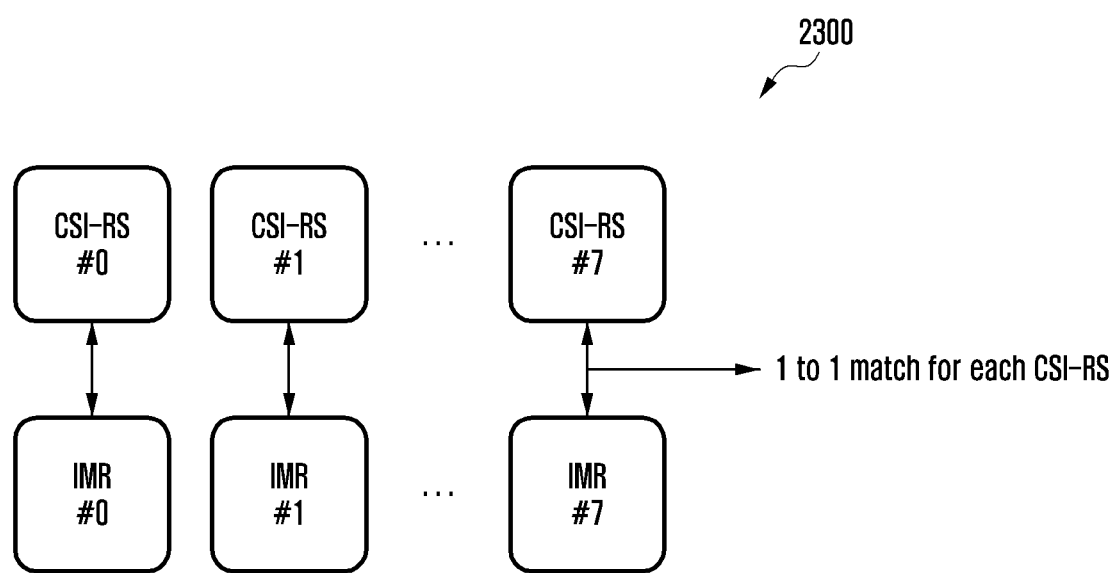
FIG. 23 illustrates an interference measurement resource configured for each CSI-RS resource for channel measurement according to an embodiment.
Figure 24:
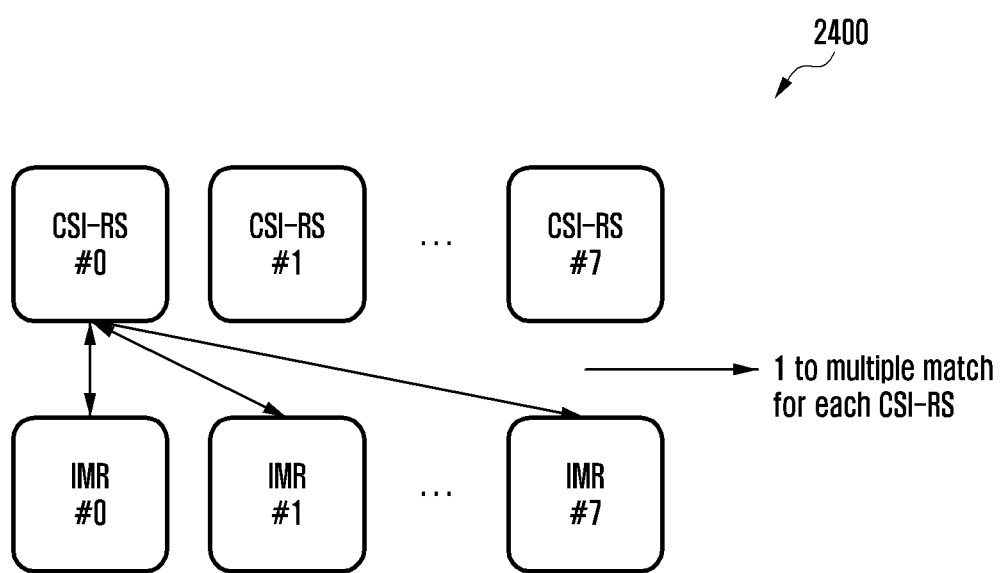
FIG. 24 illustrates a plurality of interference measurement resources set in CSI-RS resources for channel measurement according to an embodiment.

FIG. 23 illustrates a channel measurement resource and an interference measurement resource mapped on a one-to-one basis according to an embodiment, and FIG. 24 illustrates a channel measurement resource and an interference measurement resource mapped on a one-to-multiple basis according to an embodiment.

Referring to FIG. 23, the interference measurement method allows a UE to measure interference at 2300 by separately setting an interference measurement resource for each channel measurement resource. As described above, the NR can support different beams for each CSI-RS resource for beam management and reporting. If the UE supports a plurality of reception beams, different reception beams for each transmission beam should be used to measure correct interference. Therefore, different interference for each beam may be correctly applied and measured by supporting different interference measurement resources for each CSI-RS resource.

Referring to FIG. 24, the interference measurement method 2400 allocates a plurality of interference measurement resources to one channel measurement resource. Interference situations that can occur in the UE at the time of multiple beams and multi-user MIMO (MU-MIMO) transmission support are various. When the interference measurement resources are all allocated for each corresponding interference condition, the overhead for interference measurement becomes excessive. Accordingly, the interference transmitted from a plurality of resources is combined and measured as interference for generating channel reporting status information, so that the eNB can reduce the number of interference measurement resources.

Figure 25:
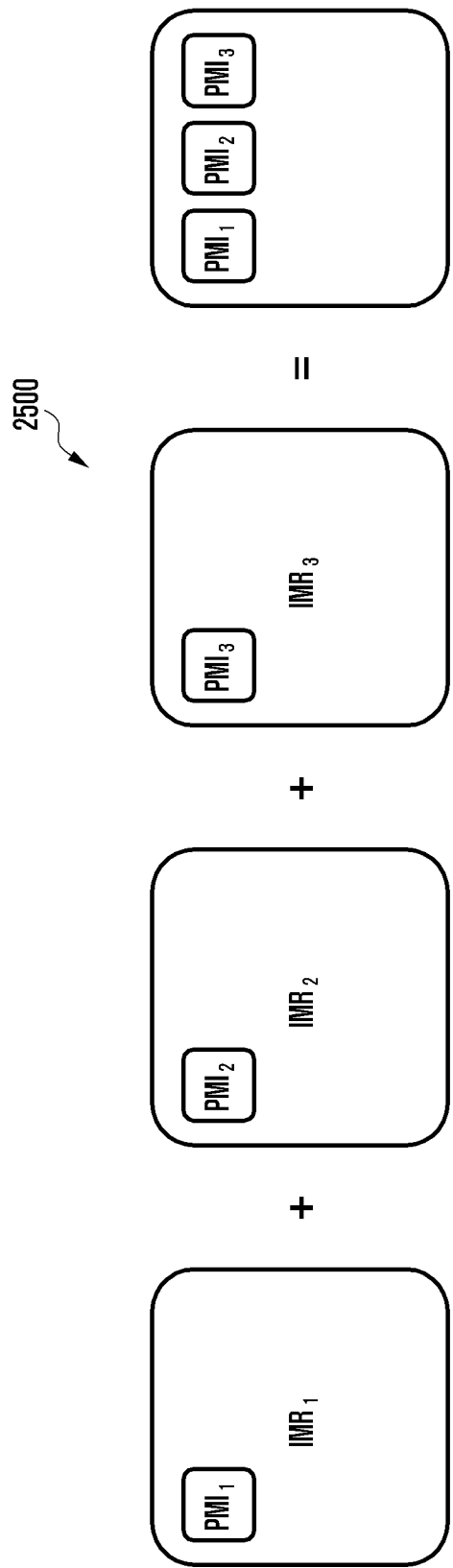
FIG. 25 illustrates a process of combining interferences measured by a terminal in a plurality of interference measurement resources and calculating a combined interference as an overall interference according to an embodiment.

FIG. 25 illustrates a UE combining interference measured in a plurality of interference measurement resources and calculating a combined interference as a total interference according to an embodiment.

Referring to FIG. 25, different PMIs are calculated according to each interference measurement resource, and the interference may be calculated at 2500 by adding up the calculated PMIs.

As described above, the interference measurement methods of FIGS. 23 and 24 have their own advantages. Thus, the following method can be considered in order for the UE to support the methods of FIGS. 23 and 24 simultaneously.

Interference measurement setting method 1: support an RRC setting for interference measurement resource for each channel measurement resource and multiple interference measurement resource for each channel measurement resource.

Interference measurement setting method 2: distinguish the interference measurement method according to the number of channel measurement resources.

Interference measurement setting method 3: support an RRC setting for distinguishing interference measurement resources for each channel measurement resource.

Interference measurement setting method 4: distinguish the interference measurement method according to repetition.

Interference measurement setting method 5: distinguish the interference measurement method according to reporting information of the CSI reporting.

The interference measurement setting method 1 supports the RRC setting for interference measurement resource for each channel measurement resource and multiple interference measurement resource for each channel measurement resource. The UE may be configured to support one interference measurement resource or a plurality of interference measurement resources for each CSI-RS resource for channel measurement through the RRC, so that the UE can perform the corresponding operation. When one interference measurement resource is set to be used for each CSI-RS resource, the number of CSI-RS resources, which is set in a CSI-RS resource set for channel measurement, and the number of CSI-RS resources, which is set in a CSI-RS resource set for interference measurement, may be the same.

The interference measurement setting method 2 distinguishes the interference measurement method according to the number of channel measurement resources. For one channel measurement resource, detailed MU-MIMO or CoMP-related information may be additionally acquired based on a single beam determined through previously obtained information. Thus, measurement considering a plurality of interference measurement resources may be used in one channel measurement resource.

However, when a plurality of channel measurement resources are set, it is for acquiring beam information. In this case, an interference measurement resource may be required for each beam. Accordingly, it is possible to support a beam-specific interference measurement resource by setting a plurality of interference measurement resources. The number of CSI-RS resources, which is set in the CSI-RS resource set for channel measurement, and the number of CSI-RS resources, which is set in the CSI-RS resource set for interference measurement, may be the same.

The interference measurement setting method 3 supports the RRC setting for distinguishing interference measurement resources for each channel measurement resource. The same number of bitmaps as the number of the channel measurement resources may be supported by the RRC setting, so that the eNB can set a resource to be used for interference measurement for each channel measurement resource as a bitmap. For example, "1" in the bitmap indicates the used interference measurement resource and "0" indicates the unused interference measurement resource. The size of the bitmap may be equal to the number of the set interference measurement resources. In addition, settings of the interference measurement resources used for each channel measurement resource may not be allowed to overlap to support different beam usage for each channel measurement resource, or may be ignored by the UE. For example, the eNB cannot set the CSI-RS resources 0 and 1 to use the interference measurement resource 0 at the same time, or the UE may ignore that the CSI-RS resources 0 and 1 use the interference measurement resource 0 at the same time.

The interference measurement setting method 4 distinguishes the interference measurement method according to repetition. As described above, the eNB can repeatedly transmit a beam to support the reception beam change of the UE, and can set repetitive transmission of the CSI-RS within the CSI-RS resource for this purpose. Because the UE must use different reception beams for each channel measurement resource, it is possible to set the interference measurement resources per each channel measurement resource or to assign the interference measurement resources to the RRC through the interference measurement setting method 3. When the interference measurement resource is set for each channel measurement resource, the number of CSI-RS resources, which is set in the CSI-RS resource set for channel measurement, and the number of CSI-RS resources, which is set in the CSI-RS resource set for interference measurement may be the same as described above.

The interference measurement setting method 5 distinguishes the interference measurement method according to reporting information of the CSI reporting. As described above, an RSRP-based reporting is information for beam management so that an analog beam is highly likely to change. A CQI-based reporting is based on a fixed analog beam, and digital beam management may be supported through the CQI-based reporting. Accordingly, the interference measurement resources for each channel measurement resource may be set in the RSRP-based reporting. In the CQI-based reporting, the interferences of the set interference measurement resources are combined and considered as one interference to generate the CSI reporting.

In order to support the interference measurement setting method, non-zero power (NZP) CSI-RS and zero power (ZP) CSI-RS can all be considered and set. When the NZP CSI-RS is set, the UE measures the channel from the NZP CSI-RS and uses the measured channel as the interference. The interference may be measured assuming that one NZP CSI-RS port is a layer of an interference signal.

When the ZP CSI-RS is set, the UE may measure the power of interference transmitted from another eNB and UE while a signal for the UE is muted, and may use the measured power to generate the CSI reporting. One type of either the ZP CSI-RS or the NZP CSI-RS for this interference measurement may be set or both types thereof may be set.

For this support, an NZP CSI-RS resource set for the CSI reporting setting in the RRC or for the channel measurement in the resource setting associated with CSIReportConfig, an NZP CSI-RS resource set for interference measurement, a ZP CSI-RS resource set for interference measurement may separately exist. The number of the set channel measurement resources may be the number of NZP CSI-RS resources, which is set and indicated as the RRC, to be used for the corresponding reporting in the NZP CSI-RS resource set for channel measurement.

In addition, the number of channel measurement resources and the number of interference measurement resources being the same can be individually applied to the ZP CSI-RS resource set and NZP CSI-RS resource set for the interference measurement. For example, the number of channel measurement resources or the number of interference measurement resources may be the same as the number of resources, which are set in the CSI-RS resource set for direct interference measurement, or the number of CSI-RSs, which are indicated or set to be used for the corresponding measurement and reporting as the RRC in the CSI-RS resource set for interference measurement.

Figure 26:
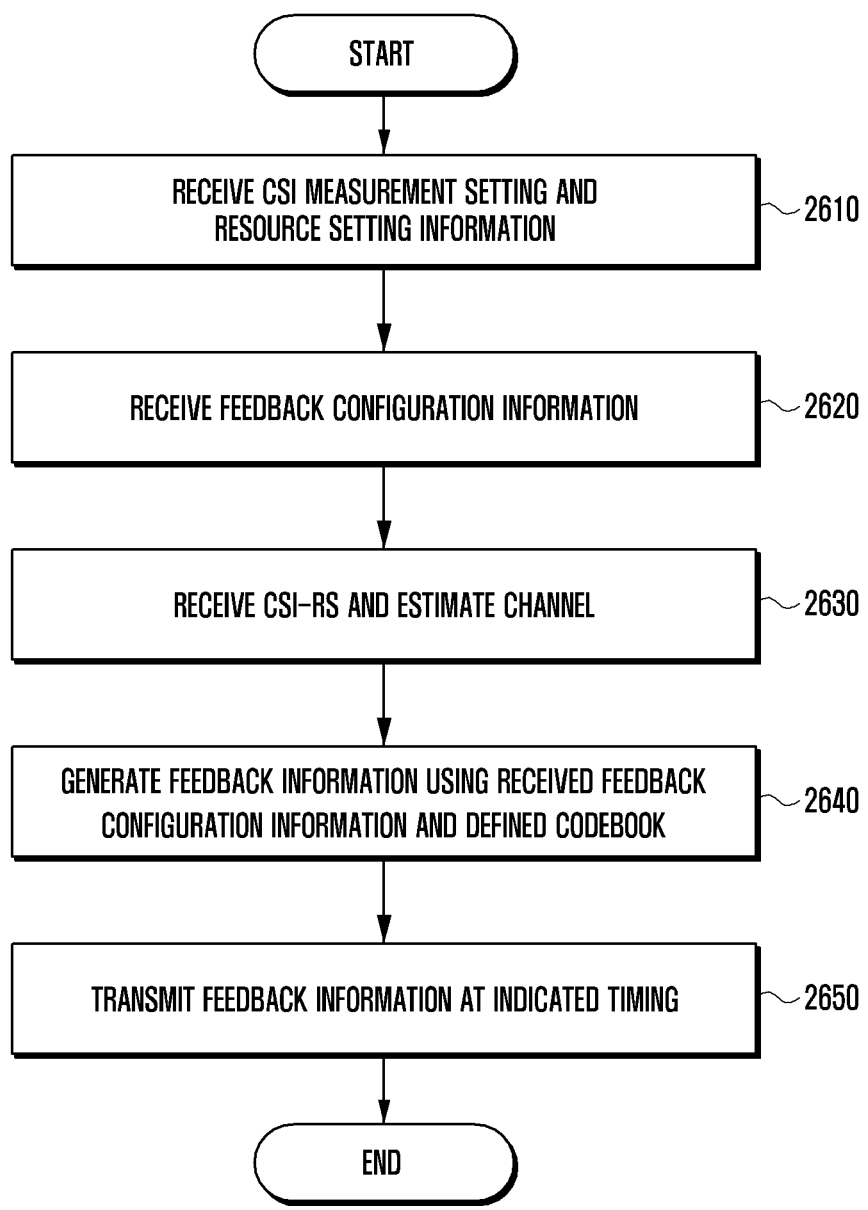
FIG. 26 is a flowchart illustrating an operation of a base station according to an embodiment.

FIG. 26 is a flowchart illustrating a procedure of a UE according to an embodiment.

Referring to FIG. 26, in step 2610, a UE receives a CSI measurement setting and resource setting information, which may include information about a reference signal for channel measurement. For example, it is possible to identify at least one of a reference signal type, the number of ports of the reference signal, a codebook type, N1 and N2, which are the number of antennas for each dimension, O1 and O2, which are oversampling factors for each dimension, one subframe config for transmitting a plurality of CSI-RSs, a plurality of resource configurations for setting a position, codebook subset restriction-related information, CSI reporting-related information, a CSI-process index, an aperiodic CSI reporting trigger, a candidate number for timing indication between the aperiodic CSI reporting trigger and the aperiodic CSI reporting, and transmission power information $P_C$.

In step 2620, the UE receives feedback configuration information through the CSI reporting setting used in the corresponding CSI measurement setting. As the corresponding information, whether to report PMI/CQI, a PMI/CQI period and offset, an RI period and offset, a CRI period and offset, wideband or subband, a submode, a CSI reporting type, a candidate number for timing indication between the aperiodic CSI reporting trigger and the aperiodic CSI reporting, etc., may be set.

In step 2630, when receiving the reference signal based on the corresponding information, the UE estimates a channel between an eNB antenna and the reception antenna of the UE based on the received reference signal.

In step 2640, the UE generates ranks, PMIs, and CQIs, which are feedback information, using the received feedback setting and a defined codebook based on the estimated channel, and selects an optimal CRI based on the generated information.

In step 2650, the UE transmits the feedback information to the eNB in accordance with the feedback setting of the eNB or the aperiodic CSI reporting trigger, and the timing indication between the aperiodic CSI reporting trigger and the aperiodic CSI reporting, at a fixed feedback timing, thereby completing the channel feedback generation and reporting process.

Figure 27:
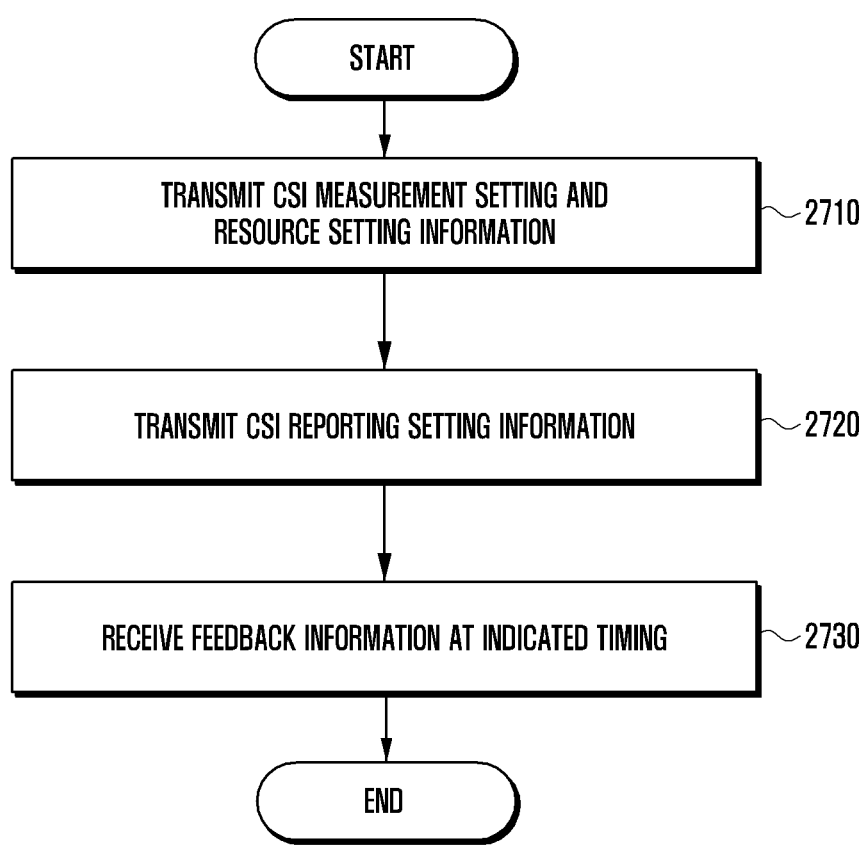
FIG. 27 is a flowchart illustrating an operation of a terminal according to an embodiment.

FIG. 27 is a flowchart illustrating a procedure of an eNB according to an embodiment of the present disclosure.

Referring to FIG. 27, in step 2710, an eNB transmits, to a UE, a reference signal for measuring a channel and setting information (e.g., a CSI measurement setting and resource setting information) for a CSI reporting configuration. As the setting information, at least one of the type of each reference signal, time, frequency resource position, service type, support feedback type, and measurement subset may be set. To transmit the reference signal based on the set information, the setting information may include at least one of the number of ports for the reference signal, N1 and N2, which are the number of antennas for each dimension, O1 and O2, which are oversampling factors for each dimension, one subframe config for transmitting a plurality of reference signals, a plurality of resource configurations for setting a position, codebook subset restriction-related information, CSI reporting-related information, a CSI-process index, and transmission power information $P_C$.

In step 2720, the eNB transmits, to the UE, feedback configuration information, e.g., CSI reporting setting information, based on at least one CSI-RS. As the corresponding information, a PMI/CQI period and offset, an RI period and offset, a CRI period and offset, wideband or subband, a submode, and a candidate number for timing indication between the aperiodic CSI reporting trigger and the aperiodic CSI reporting may be set.

Thereafter, the eNB transmits the configured CSI-RS to the UE. The UE estimates a channel for each antenna port and estimates an additional channel for a virtual resource based on the estimated channel. The UE determines feedback, generates CRI, PMI, RI, and CQI corresponding to the feedback, and transmits the generated CRI, PMI, RI, and CQI to the eNB.

In step 2730, the eNB receives feedback information from the UE at a predetermined timing, and uses the received feedback information to determine a channel state between the UE and the eNB.

Figure 28:
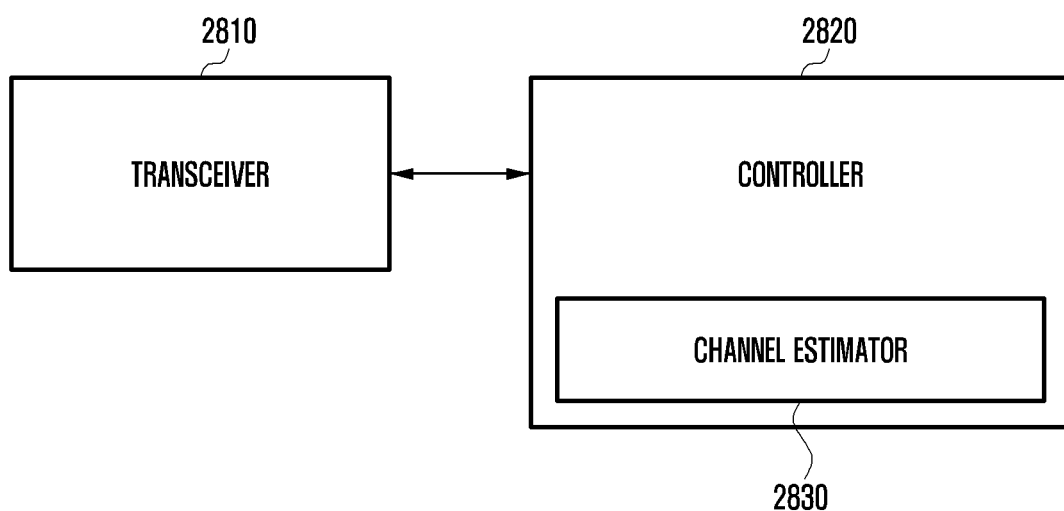
FIG. 28 illustrates a terminal according to an embodiment.

FIG. 28 illustrates a UE according to an embodiment.

Referring to FIG. 28, the UE includes a transceiver 2810 and a controller 2820. The transceiver 2810 performs a function of transmitting or receiving data to and from the outside (e.g., eNB). The transceiver 2810 may transmit feedback information to the eNB under the control of the controller 2820.

The controller 2820 controls the statuses and operations of all components constituting the UE. Specifically, the controller 2820 generates feedback information according to information allocated from the eNB. The controller 2820 controls the transceiver 2810 to feed back the generated channel information to the eNB according to timing information allocated from the eNB.

The controller 2820 includes a channel estimator 2830. The channel estimator 2830 determines the position of the corresponding resource in the time and frequency resources through service and feedback information received from the eNB, and identifies necessary feedback information through CSI-RS and feedback allocation information related thereto. The channel estimator 2830 estimates a channel using the received CSI-RS based on the feedback information.

Although FIG. 28 illustrates the UE including only the transceiver 2810 and the controller 2820, the present disclosure is not limited thereto, and the UE may include various additional components according to functions performed in the UE. For example, the UE may further include a display unit for displaying a current status of the UE, an input unit for inputting a signal such as function performance by a user, a storage unit for storing data generated in the UE, etc.

Although the channel estimator 2830 is illustrated as being included in the controller 2820, the present disclosure is not limited thereto.

The controller 2820 may control the transceiver 2810 to receive setting information for each of at least one reference signal resource from the eNB. The controller 2820 may control the transceiver 2810 to measure the at least one reference signal and to receive feedback configuration information for generating feedback information according to the measurement result from the eNB.

In addition, the controller 2820 may measure the at least one reference signal received through the transceiver 2810 and may generate feedback information according to the feedback configuration information. The controller 2820 may control the transceiver 2810 to transmit the generated feedback information to the eNB at a feedback timing according to the feedback configuration information.

Figure 29:
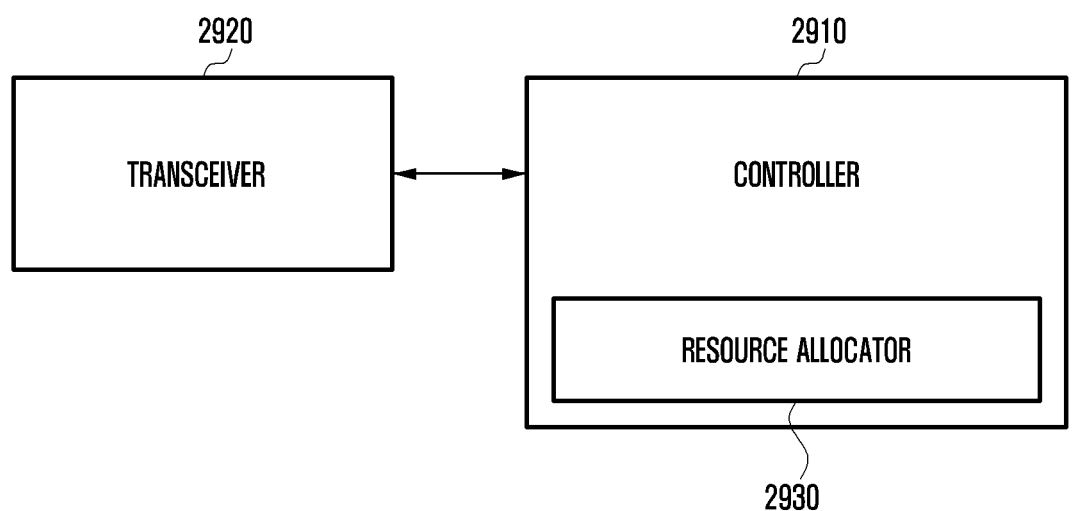
FIG. 29 illustrates a base station according to an embodiment.

FIG. 29 illustrates an eNB according to an embodiment.

Referring to FIG. 29, the eNB includes a controller 2910 and a transceiver 2920. The controller 2910 controls the statuses and operations of all components constituting the eNB. Specifically, the controller 2910 allocates, to a UE, CSI-RS resources for related setting and channel estimation for the UE to acquire resource information, and allocates a feedback resource and a feedback timing to the UE.

The controller 2910 includes a resource allocator 2930.

In addition, the controller 2910 allocates the feedback setting and feedback timing to prevent a collision of feedback from a plurality of UEs, and receives and analyzes the feedback information set at the corresponding timing. The transceiver 2920 transmits and receives data, a reference signal, and feedback information to and from the UE. The transceiver 2920 transmits the CSI-RS to the UE through resources allocated under the control of the controller 2910, and receives feedback on the channel information from the UE. The transceiver 2920 transmits the reference signal based on CRI, rank, partial PMI information, CQI, etc., obtained from the channel state information transmitted by the UE.

Although the resource allocator 2930 is included in the controller 2910, the present disclosure is not limited thereto.

The controller 2910 may control the transceiver 2920 to transmit the setting information for each of the at least one reference signal to the UE, or may generate the at least one reference signal. The controller 2910 may control the transceiver 2920 to transmit, to the UE, feedback configuration information for generating the feedback information according to the measurement result. The controller 2910 may control the transceiver 2920 to transmit the at least one reference signal to the UE and to receive the feedback information transmitted from the UE at a feedback timing according to the feedback configuration information. The controller 2910 may transmit the feedback configuration information to the UE, may transmit the CSI-RS to the UE, and may receive the feedback configuration information and the feedback information generated based on the CSI-RS from the UE.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method performed by a terminal in a communication system, the method comprising:
   receiving, from a base station, a plurality of channel state information (CSI) report configurations;
   in case that two CSI reports overlap in a time domain resource based on the CSI report configurations, identifying one of the two CSI reports having higher priority; and
   transmitting, to the base station, the identified CSI report,
   wherein priority of a CSI report is identified based on at least one of a time domain transmission type of the CSI report and a report quantity type of the CSI report,
   wherein the time domain transmission type is prioritized over the report quantity type in an identification of the priority, and
   wherein the report quantity type is related to whether the CSI report includes a reference signal received power (RSRP) report.

2. The method of claim 1,
   wherein the priority according to the time domain transmission type is high in an order of an aperiodic CSI report, a semi-persistent CSI report, and periodic CSI report.

3. The method of claim 1,
   wherein the priority according to the report quantity type is high in an order of a CSI report including the RSRP report and a CSI report not including the RSRP report.

4. The method of claim 1,
   wherein the priority is high in an order of a CSI report associated with a lower number of a cell identifier and a CSI report associated with a higher number of a cell identifier.

5. The method of claim 1,
   wherein the priority is high in an order of a CSI report associated with a lower number of a CSI report configuration identifier and a CSI report associated with a higher number of a CSI report configuration identifier.

6. A method performed by a base station in a communication system, the method comprising:
   transmitting, to a terminal, a plurality of channel state information (CSI) report configurations; and
   in case that two CSI reports are overlap in a time domain resource based on CSI report configurations, receiving, from the terminal, one of the two CSI reports having higher priority,
   wherein priority of a CSI report depends on at least one of a time domain transmission type of the CSI report and a report quantity type of the CSI report,
   wherein the time domain transmission type is prioritized over the report quantity type in an identification of the priority, and
   wherein the report quantity type is related to whether the CSI report includes a reference signal received power (RSRP) report.

7. The method of claim 6,
   wherein the priority according to the time domain transmission type is high in an order of an aperiodic CSI report, a semi-persistent CSI report, and periodic CSI report.

8. The method of claim 6,
   wherein the priority according to the report quantity type is high in an order of a CSI report including the RSRP report and a CSI report not including the RSRP report.

9. The method of claim 6,
   wherein the priority is high in an order of a CSI report associated with a lower number of a cell identifier and a CSI report associated with a higher number of a cell identifier.

10. The method of claim 6,
    wherein the priority is high in an order of a CSI report associated with a lower number of a CSI report configuration identifier and a CSI report associated with a higher number of a CSI report configuration identifier.

11. A terminal in a communication system, the terminal comprising:
    a transceiver; and
    a controller configured to control to:
    receive, from a base station via the transceiver, a plurality of channel state information (CSI) report configurations,
    in case that two CSI reports overlap in a time domain resource based on the CSI report configurations, identify one of the two CSI reports having higher priority, and
    transmit, to the base station via the transceiver, the identified CSI report,
    wherein priority of a CSI report is identified based on at least one of a time domain transmission type of the CSI report and a report quantity type of the CSI report,
    wherein the time domain transmission type is prioritized over the report quantity type in an identification of the priority, and
    wherein the report quantity type is related to whether the CSI report includes a reference signal received power (RSRP) report.

12. The terminal of claim 11,
    wherein the priority according to the time domain transmission type is high in an order of an aperiodic CSI report, a semi-persistent CSI report, and periodic CSI report.

13. The terminal of claim 11,
    wherein the priority according to the report quantity type is high in an order of a CSI report including the RSRP report and a CSI report not including the RSRP report.

14. The terminal of claim 11,
    wherein the priority is high in an order of a CSI report associated with a lower number of a cell identifier and a CSI report associated with a higher number of a cell identifier.

15. The terminal of claim 11,
    wherein the priority is high in an order of a CSI report associated with a lower number of a CSI report configuration identifier and a CSI report associated with a higher number of a CSI report configuration identifier.

16. A base station in a communication system, the base station comprising:
    a transceiver; and
    a controller configured to control to:
    transmit, to a terminal via the transceiver, a plurality of channel state information (CSI) report configurations, and
    in case that two CSI reports are overlap in a time domain resource based on the CSI report configurations, receive, from the terminal via the transceiver; one of the two CSI reports having higher priority,
    wherein priority of a CSI report depends on at least one of a time domain transmission type of the CSI report and a report quantity type of the CSI report, wherein the time domain transmission type is prioritized over the report quantity type in an identification of the priority, and wherein the report quantity type is related to whether the CSI report includes a reference signal received power (RSRP) report.

17. The base station of claim 16,
wherein the priority according to the time domain transmission type is high in an order of an aperiodic CSI report, a semi-persistent CSI report, and periodic CSI report.

18. The base station of claim 16,
wherein the priority according to the report quantity type is high in an order of a CSI report including the RSRP report and a CSI report not including the RSRP report.

19. The base station of claim 16,
wherein the priority is high in an order of a CSI report associated with a lower number of a cell identifier and a CSI report associated with a higher number of a cell identifier.

20. The base station of claim 16,
wherein the priority is high in an order of a CSI report associated with a lower number of a CSI report configuration identifier and a CSI report associated with a higher number of a CSI report configuration identifier.

* * * * *